(12) United States Patent
Cobos Marquez

(10) Patent No.: US 12,738,856 B2
(45) Date of Patent: Sep. 15, 2026

(54) SWITCH MODE ELECTRICAL POWER CONVERTER

(71) Applicant: DIFFERENTIAL POWER, SL, Madrid (ES)

(72) Inventor: Jose Antonio Cobos Marquez, Madrid (ES)

(73) Assignee: DIFFERENTIAL POWER, SL, Madrid (ES)

( * ) Notice: Subject to any disclaimer, the term of this patent is extended or adjusted under 35 U.S.C. 154(b) by 200 days.

(21) Appl. No.: 18/842,981

(22) PCT Filed: Mar. 4, 2022

(86) PCT No.: PCT/EP2022/055585
§ 371 (c)(1),
(2) Date: Aug. 30, 2024

(87) PCT Pub. No.: WO2023/165710
PCT Pub. Date: Sep. 7, 2023

(65) Prior Publication Data

US 2025/0286467 A1 Sep. 11, 2025

(30) Foreign Application Priority Data

Mar. 1, 2022 (EP) .................................... 22382179

(51) Int. Cl.
*H02M 3/335* (2006.01)
*H02M 1/00* (2007.01)
*H02M 1/34* (2007.01)

(52) U.S. Cl.
CPC ..... *H02M 3/33576* (2013.01); *H02M 1/0058* (2021.05); *H02M 1/34* (2013.01); *H02M 3/33584* (2013.01)

(58) Field of Classification Search
CPC .. H02M 1/0058; H02M 1/34; H02M 3/33576; H02M 3/33584
See application file for complete search history.

(56) References Cited

U.S. PATENT DOCUMENTS 5,303,138 A * 4/1994 Rozman ................ H02M 7/217 363/20
7,046,525 B2 * 5/2006 Smidt ............... H02M 3/33584 363/16

(Continued)

FOREIGN PATENT DOCUMENTS

KR 20200130272 11/2020
WO WO2021094077 5/2021

*Primary Examiner* — Jue Zhang
(74) *Attorney, Agent, or Firm* — Sheridan Ross P.C.

(57) ABSTRACT

A switch mode electrical power converter comprises a transformer, a power switch arranged in a primary side of transformer; a second power switch arranged in a secondary side of the transformer, a driver that turns on and turns off the power switch and optionally the second power switch by driving terminals; and optionally a control unit that controls the driver. The power switches operated under the action of a driving signal provided by the driver providing a direct transfer of power from the primary port to the secondary port through the transformer with a limited magnetic energy storage that is reset during a reset time of the power converter. A regulation of the power converter is controlled by a switching frequency variation of any of the power switches or phase shift or a combination thereof.

13 Claims, 22 Drawing Sheets

(56) References Cited

U.S. PATENT DOCUMENTS

| | | | | |
|---|---|---|---|---|
| 10,128,766 | B1 * | 11/2018 | Strijker | H02M 3/33584 |
| 2002/0167821 | A1 | 11/2002 | Xing et al. | |
| 2004/0052094 | A1 | 3/2004 | Bottrill | |
| 2005/0270001 | A1 * | 12/2005 | Jitaru | H02M 3/3385 323/247 |
| 2014/0028263 | A1 | 1/2014 | Jo et al. | |
| 2022/0416674 | A1 * | 12/2022 | Cobos Marquez | H02M 3/33523 |

* cited by examiner

Sequence A-B-D $Vo \cdot \frac{n1}{n2} > Vin$ imag>0

*Sequence A–B–C–D*

$$Vo \bullet \frac{n1}{n2} = Vin \qquad imag \approx 0$$

SWITCH MODE ELECTRICAL POWER CONVERTER

RELATED APPLICATIONS

This application is based on prior filed copending International Application No. PCT/EP2022/055585 filed Mar. 4, 2022, which claims priority to European Application No. 22382179.4, filed Mar. 1, 2022, the entire subject matter of these applications is incorporated herein by reference in its entirety.

TECHNICAL FIELD

This invention is in the field of the electrical power converters which process electrical power from a DC input energy source to a DC load output with the feature that power may flow bi-directionally just exchanging the energy source and the load. More specifically, the present invention refers to an electrical switch mode power converter.

BACKGROUND

WO2021094077A1 discloses an electrical power converter in which the primary inverting power switch and the secondary rectifying power switch are both simultaneously in ON conduction state and in OFF conduction state. In addition, in WO2021094077A1 the load is connected directly to the transformer without an inductor in between.

US2004052094A1 discloses an electrical power converter 104, see FIG. 3, configured to connect a primary port with a secondary port including a DC energy source or an AC energy source and the secondary port including a DC load or an AC load, comprising: M2, M3 and M4 power switches providing a "first power switch" connecting a transformer to the energy source (Vin) during the on time (d·T). There is in addition another power switch D13 that connects the transformer to an output filter, not to the load, i.e., the load is connected to the inductor of the output filter, in parallel with C3 (see FIG. 5 of US2004052094A1).

US2004052094A1 requires to operate properly other additional power switches that conduct alternately to the first power switch, that are following detailed:

A. Power switch D16 of FIG. 5 (the last at the right side, erroneously termed as D15 in FIG. 3) is required to freewheel the inductor current, during converter OFF time, (1-d)·T. Therefore, conduction time of power switch D16 (converter OFF time, (1−d)·T) is alternate to the conduction time (converter ON time, d·T) of the first power switch.

B. Power switches (D6, D15, D19 and D21) are further required to demagnetize the transformer. These power switches conduct during converter OFF time, (1−d)·T. Therefore, their conduction time (converter OFF time, (1−d)·T) is alternate to the conduction time (converter ON time, d·T) of the first power switch.

Consequently, there is not any instant of time in which the energy source, Vin, and load are connected directly through the transformer, because there is an output inductor L2 in between. In US2004052094A1 voltage regulation is attained by adjusting the voltage applied to L2 controlled by the conduction time (converter ON time, d·T). Therefore, in US2004052094 there is no time at all in which all the power switches of the circuit conduct simultaneously.

US2014028263A1 refers to a cell balance circuit and to a cell balance apparatus with a low cost and with a compact size configured to equalize the charge voltages of rechargeable batteries when the rechargeable batteries are charged or discharged, while suppressing deterioration of the rechargeable batteries.

As an exemplary embodiment, the circuit of FIG. 14 of US2014028263A1 includes two circuits connected to each other, configured to synchronously control the switches SW1 and SW2 wherein the purpose of each circuit is to charge each cell to the voltage of the DC power supply 31, so that the cells are balanced. Therefore, the purpose of the circuit of FIG. 14 is not to supply a load (unshown), but to balance the battery cells to a third and independent voltage source (31). If there were only one circuit, US2014028263A1 could not work.

Thus, there is indeed a power supply 31 in the referred FIG. 14 that supplies charge to balance the cells of the battery, "when there is a difference in the charge voltage between the rechargeable batteries BT1 and BT2" so as to equalize the respective charge voltages of the rechargeable batteries BT1 and BT2". This is in any case a "transient" balancing current to balance the cells. On the other hand, charging or discharging current of the battery is supplied by an unshown battery charger and by an unshown load, and not supplied by power supply 31.

Moreover, the charging current and the discharging current flow by all the cells simultaneously and do not necessarily produce an unbalance of the cells, hence power supply 31 does not supply any current if the cells are balanced when the battery is charging or discharging. The sole purpose of power supply 31 of the US2014028263 is to balance the cells, not to supply any power to a load.

SUMMARY

The present invention provides a switch mode power converter proposing a different approach than WO2021094077 using as a basis some similar circuitry, because there is an intrinsic phase shift between the conduction status of the involved inverting power switch and the rectifying power switch.

As in the WO2021094077 the switches of input and output ports may both be operated with a good FOM (with d>50%, i.e. 90%) because both switches are in On state simultaneously and Off state simultaneously to provide a direct power flow from the input port to the output port through the transformer or autotransformer.

Additionally, in the WO2021094077 the reset of the transformer is produced by a resonance between the magnetizing inductance of the transformer and the capacitances in parallel with the power switches, whereas in this invention the reset of the transformer also involves the series inductances of the transformer and the parasitic (or added) capacitances.

The transformer reset of this invention is achieved by a sequence of topological power stages that include not only the magnetizing inductance, but also the series inductances, whose current is commanded by the voltage created by the capacitances in parallel with the power switches, which can be controlled by an active clamp, and a phase shift between the driving signals of the first power switch and the second power switch.

Moreover, in this invention the combination of a number of control parameters, including the duty cycles of the first and second power switches, their phase shift and the switching frequency enables the control of not only the output voltage of the DC-DC converter but also the voltage of the clamp capacitors that drive the direct current through the transformer. It should be noted that the direct time may be maximized hence reducing the RMS value of the direct current, said direct time being adjusted to operate the power switches close to their technological limit, that is, their maximum breakdown voltage.

The invention provides a switch mode electrical power converter which has been designed to operate connecting periodically a primary port with a secondary port, the primary port including a DC energy source and the secondary port including a DC load, although a bidirectional power converter can be obtained applying the same principles as will be explained below.

The electrical power converter of this invention can be implemented using a semiconductor technology selected among Si, GaN, SiC, or other semiconductors including one or more of the following components: junctions or hetero-junctions, hetero-structures, piezoelectric structures, metal-oxide-semiconductor field-effect transistor, an insulated gate bipolar transistor, a bipolar junction transistor, a gate turn-off thyristor, or a combination thereof.

According to the present invention the proposed switch mode electrical power converter comprises, in a preferred embodiment:

- a transformer, in particular a power transformer, including a magnetizing inductance and for each of the transformer winding a series inductance;
- one or more first power switches each of them having a first driver terminal to be driven and each first power switch having a capacitance in parallel;
- one or more second power switches each of them having a second driver to be optionally driven and each second power switch having a capacitance in parallel; and
- a driver that by means of driving signals applied by a corresponding driving terminal turns on and turns off the one or more first power switches and optionally turns on and turns off the one or more second power switches.

In addition, in several preferred embodiments of this invention the switch mode electrical power converter will include a control unit that controls the driver, although the referred driver may not be controlled in other embodiments.

In an embodiment the transformer is an autotransformer enabling a partial power processing.

In an embodiment the first or at least second power switches are included in windings of the transformer or autotransformer or in a part thereof.

According to this invention the one or more first power switches are arranged in a primary side of the transformer or autotransformer and the one or more second power switches are arranged in a secondary side of the transformer or autotransformer and both first and second power switches are configured to connect the primary port DC energy source to the secondary port DC load, through the transformer or autotransformer.

The referred first and said second power switches are further configured to be operated under the action of a driving signal provided by the driver and applied to driving terminals providing a direct conducting status during a direct conduction time with a direct transfer of power from the primary port to the secondary port through the transformer with a limited magnetic energy storage, said limited magnetic energy storage being reset during a reset time of the power converter.

Which such an arrangement a variety of sequences of intervals including corresponding topological circuits are obtainable assisting in the transformer demagnetization during a reset time under a switching frequency, starting with an interval including a capacitance in parallel with each first power switch, followed by another interval including a capacitance in parallel with each of second power switch after a phase shift, ending with another interval including a capacitance only with the second power switch.

As a consequence, the mean value of the current through the second power switch/es during the direct conduction time multiplied by the ratio between the direct conduction time and the switching frequency period determine the gain of the power converter.

Consequently, a regulation of the power converter can be controlled by a switching frequency variation, the duty cycle variation of the first power switch, the duty cycle variation of the second power switch, and the phase shift between the first power switch and the second power switch driving signals provided by a control unit.

From this point onwards and for the sake of simplicity the invention will be described assuming that the switch mode electrical power converter of the invention comprises a first power switch and a second power switch.

As per this invention, the first and second power switches (31, 32) are all controlled switches implemented with transistors or comprise at least one controlled power switch implemented with a transistor and at least one non-controlled power switch implemented with a diode.

Also, in a preferred embodiment the first winding of the transformer has connected a series inductance (i.e., leakage) and optionally and added series inductances while the first power switch has connected a parallel capacitance (i.e., parasitic capacitance) and optionally added further parallel capacitances.

Also, in a preferred embodiment the second winding of the transformer has connected a series inductance (i.e., leakage) and optionally and added series inductances while the second power switch has connected a parallel capacitance (i.e., parasitic capacitance) and optionally added further parallel capacitances.

With the switch mode electrical power converter, previously disclosed a direct conducting status interval, termed interval A, is defined by the conduction time of the first power switch and the second power switch both in On state to provide a direct power flow from the input port to the output port through the transformer or autotransformer. It follows that interval A can have a duration higher than 50% of the period of the switching frequency thereby reducing an RMS value of the current flowing through all the power switches for a given average converter output current.

Furthermore, as per this invention, interval A comprises a transformer reset before a next switching cycle, this reset comprising a variety of selected sequences of intervals comprising the following intervals:

Interval B: the first power switch (31) is in Off state, and the second power switch (32) is in On state producing reset voltages determined by:
- the first winding series inductance;
- the second winding series inductance;
- the magnetizing inductance;
- a first capacitance in parallel;
- optionally a first clamping capacitance in parallel connected by a first clamping switch; and
- the input and output voltages;

Interval C: the first power switch is in Off state, and the second power switch is in Off state producing reset voltages determined by:
- the first winding series inductance;
- the second winding series inductance;
- the magnetizing inductance;
- a first capacitance in parallel;

optionally a first clamping capacitance in parallel connected by a first clamping switch;
a second capacitance in parallel;
optionally a second clamping capacitance in parallel connected by a second clamping switch; and
the input and output voltages;

Interval D: the first power switch is in On state, and the second power switch is in Off state producing reset voltages determined by:
the first winding series inductance;
the second winding series inductance;
the magnetizing inductance;
a second capacitance in parallel;
optionally a second clamping capacitance in parallel connected by a second clamping switch; and
the input and output voltages;

wherein a timing of the driving signals applied to the driving terminal (101) of the first power switch (31) and/or to the driving terminal (102) of the second power switch (32) are configured by a control unit acting on the driver to set the time duration of intervals A, B, C and D under which the switch mode electrical power converter (2) operates, so that a regulated switch mode electrical power converter (2) is obtained.

In this way driving signals for the primary power switch and the secondary power switch provide a sequence of said variety of sequences comprising at least a sequence A-B-C-D or a sequence A-B-D or a sequence A-B-A-D.

According to this invention the timing of the driving signals applied to the driving terminal of the first power switch and/or to the second power switch are configured by a control unit acting on the driver to adjust the time duration of intervals A, B, C and D under which the switch mode electrical power converter operates, so that a regulated switch mode electrical power converter is obtained.

Therefore, the switch mode electrical power converter of this invention is regulated by adjusting the timing of the intervals A, B, C and D.

The gain of the converter is defined by the timing of these intervals which are adjusted by the duty cycle of the first power switch and/or the duty cycle of the second power switch and/or the phase shift between the driving signals of first power switch and second power switch and/or the switching frequency of the power converter.

These parameters may be fixed or may be controlled by a control unit.

In the switch mode power converter of the invention the output voltage is the product of the load resistance multiplied by the mean current flowing through the second power switch. The mean value of the current in the second power switch is equal to the mean value of the current flowing through the secondary winding of the transformer.

In an embodiment the control unit provides instruction adapted to configure the On and Off time of all the power switches by means of a setting of the driving signal applied to the driving terminals such that at least one power switch of the at least two power switches are turned On once its own voltage is near or equal to zero, i.e., Zero Voltage Switching or ZVS.

In an alternative embodiment the switch power converter of this invention can operate with zero current switching to reduce switching losses.

In an embodiment of this invention the referred additional clamping power switches (of the intervals B, C and D) are driven by an additional driving terminal and configured to clamp a maximum voltage of the first and second power switches. Furthermore, a timing of the driving signal applied to the driving terminal of the first power switch and the driving signal applied to its additional driving terminal of the clamping power switch are configured to set a maximum voltage applied to the first power switch.

Likewise, a timing of the driving signal applied to the driving terminal of the second power switch and the driving signal applied to its additional driving terminal of the clamping power switch are configured to set a maximum voltage applied to the second power switch. This meaning that adjustment can be provided so that the switch mode power converter of the invention is working close to its technological limit of the power switches by increasing the duty cycles to reduce the RMS values of the current in primary side and/or secondary side, reducing conduction losses in either side of the converter.

In an alternative embodiment a timing of the driving signals applied to the driving terminals of the first and second power switches and are exchanged enabling power flow from secondary port to primary port, providing a bi-directional power converter.

In another embodiment the first clamp capacitor and the energy source of the input port are exchanged and/or the second clamp capacitor and the load of the output port are exchanged.

A further embodiment of the proposed switch mode power converter envisages solutions where the transformer or autotransformer has additional secondary windings and rectifying power switches enabling a multiple-output electrical power converter.

Also, to be considered included in this invention is an embodiment in which the primary port or secondary port are comprised by multiple stacked ports enabling a multi-level electrical power converter.

As already proposed in the cited WO2021094077A1 the switch mode power converter of this invention can be further connected to other circuits in particular comprising the integration of a Buck converter including an additional power switch forming a three port Buck-DPX regulated DC-DC-DC switch power converter. In this arrangement the magnetizing inductance of the DPX converter is operated as the inductance of the Buck converter, and the gain of the converter between input and output ports is regulated by changing the duty cycle and/or switching the frequency, wherein the power may flow from at least one port of said three ports to at least one of the other remaining ports forming a three-port bidirectional switch mode power converter.

In a similar way and still in another embodiment the switch mode power converter of this invention can be connected to a Buck converter including an additional power switch forming a three port Buck-DPX regulated AC-DC-DC switch power converter. In this arrangement the magnetizing inductance of the DPX converter is operated as the inductance of the Buck converter, and the gain of the converter between input and output ports is regulated by changing the duty cycle and/or the switching frequency, wherein the power may flow from at least one port of said three ports to at least one of the other remaining ports.

In the last two embodiments described power switches (the cited first power switch and second power switch) of the DPX and the additional power switch of the Buck converter, are configured to operate the three port Buck-DPX as quasi-static DC-DC cells, wherein first DC input port receives DC quasi static voltage from a rectified high power factor AC voltage, second DC output port is configured to act as an energy buffer and third DC output port is configured to have tight DC voltage regulation.

Moreover, also concerning to the two last embodiments disclosed (connection to a Buck converter, integrated in the switch mode power converter), the switching frequency and duty cycle of the power switches of the DPX and the duty cycle of the additional power switch of the Buck converter of the three port Buck-DPX are set by the control unit to provide a power flow according to three operative power pathways:

A. from AC input port the power flows through to the first DC output port and through the second DC output port;
B. from AC input port and the first DC output port the power flows to the second DC output port;
C. from the first DC output port the power flows to the second DC output port.

In an alternative embodiment of the switch mode electrical power converter connected to a Buck converter an energy buffer has been provided comprising at least a capacitor configured to be dynamically adjusted to minimize indirect power with a voltage mean value in relation with the RMS value of the input voltage.

Other features of the invention will be described in detail in the following:

DETAILED DESCRIPTION

Figure 1:
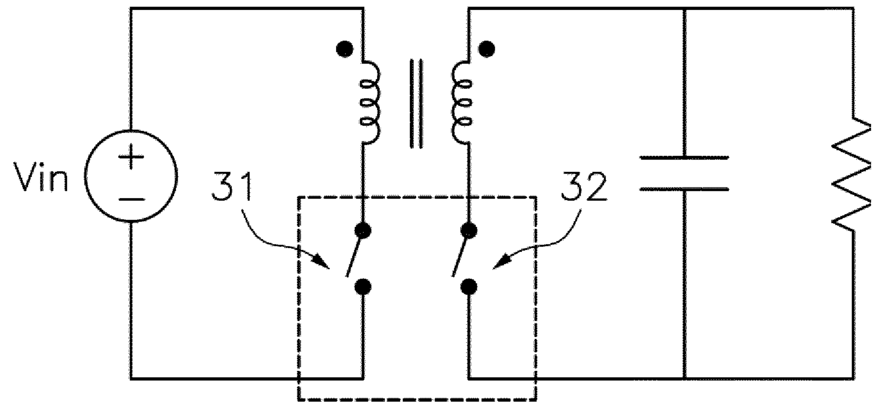
FIG. 1 shows an exemplary embodiment of an electrical power converter according to the cited WO2021094077A1.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The invention is directed to an electrical switch mode power converter including a transformer or autotransformer designed to connect a primary port with a secondary port, the primary port including a DC energy source and the secondary port including a DC load.

The DC/DC power conversion cells may be used to implement DC/AC, AC/AC and AC/DC electrical power converters by a PWM modulation of the power switches conduction time.

This is because an AC voltage may be accounted as a DC voltage for a high enough switching frequency of the power switches of a DC-DC switched mode power converter. As an example, a DC-DC power converter cell switching at hundreds of kHz may be used to generate an AC voltage in the range of milli seconds. In the same way, a line rectifier connected to the 50 Hz or 60 Hz AC mains may be implemented with a DC-DC switched mode power converter switching at a switching frequency order of magnitude higher, i.e. 300 kHz.

In this description the concept of Figure of Merit in electrical power converters, related to the power switches of a power converter, is used, according to the following definition:

A typical Figure of Merit (FOM) of high-density electrical power converters is "power losses" times "volume". A more specific FOM for high current converters is "conduction power losses in the power switches" times "footprint of the power switches". Assuming all the power switches in a dc-port of the DC-DC converter have the same area, the simplified $FOM^{+}_{port}$ may be normalized as $FOM_{port}$ as follows:

$$FOM^{*}_{port} = N\sum_{j} i^{2}_{j\_rms}$$

$$FOM_{port} = N\frac{\sum_{j} i^{2}_{j\_rms}}{I^{2}_{port}}$$

Accounting j for each power switch in that DC port (either inverting power switches or rectifying power switches) and being $i_{j\_rms}$ the RMS value of the current flowing through each power switch and $I_{port}$ the mean value flowing into or out of each DC port.

Each of the power switches of the power converter of the invention are configured to be operated under the action of a driving signal provided by a driver, which can be controlled or not, and the driving signal is applied to a driving terminal of each of the power switches providing a direct conducting status during a direct conduction time with a direct transfer of power from the primary port to the secondary port through a transformer of the power converter and with a limited magnetic energy storage, said limited magnetic energy storage being reset during a reset time of the power converter.

In this invention the terms “input port” and “input energy source” and “energy source” have been used indistinctly.

Figure 2A:
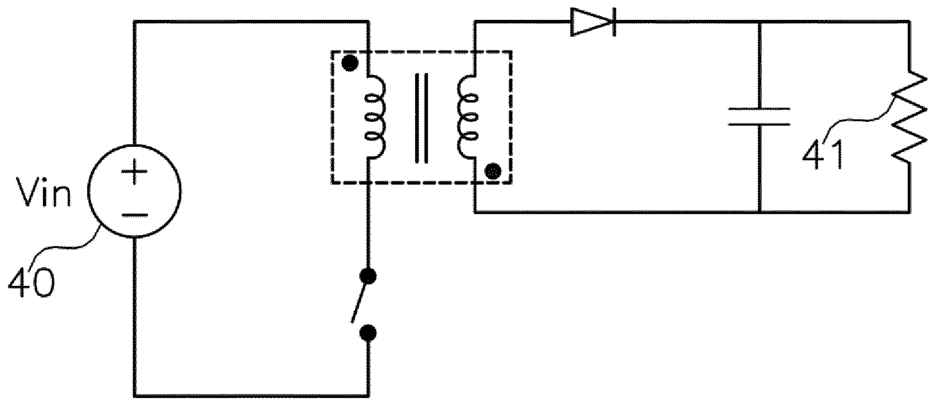
FIG. 2A shows a flyback converter connecting the input port to the output port 41 through a magnetic component.

FIG. 2A shows a flyback converter connecting the input port 40 to the output port 41 through a magnetic component, usually termed as coupled inductor because although it resembles a direct connection between the input energy source to the load through the magnetic component, in reality, the power switch in the primary side and the diode in the secondary side never conduct simultaneously, hence there is no direct connection nor direct energy transfer from input energy source to load. Note the different position of the corresponding terminals in the magnetic component, hence coupled inductor, compared to the transformer that is described in this invention. On the contrary, the mechanism to supply power to the load is by storing energy in each switching cycle in the coupled inductors. A flyback converter could also be considered an antecedent of the invention in the sense that there is a magnetic component with two windings, a primary power switch and a secondary power switch, though in a flyback converter there is no DIRECT power transfer from input energy source 40 to load 41. On the contrary, the output power is previously stored and delivered in the magnetic component, which is often named in the literature “coupled inductors” instead of transformer, due to the way it operates in terms of energy storage instead of energy transfer. The corresponding terminals in the windings of this magnetic components are opposite to the corresponding terminals in windings of the transformer of this patent application.

Figure 2B:
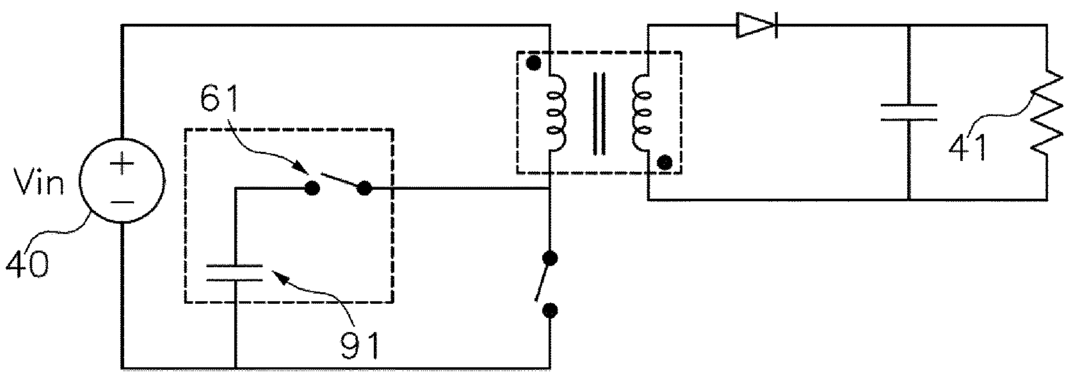
FIG. 2B illustrates a flyback converter including an active clamp.

FIG. 2B illustrates a flyback converter including an active clamp. An “active clamp” 61, 91, is known in the literature and applied to multiple power topologies. Some advantages include: a) limit the maximum voltage applied to the power switch; b) reset the transformer with maximum possible time, that is the OFF time, and hence minimum voltage; c) soft switching in the power switch; and d) operate the magnetic component with null dc magnetic level in the core.

Figure 2C:
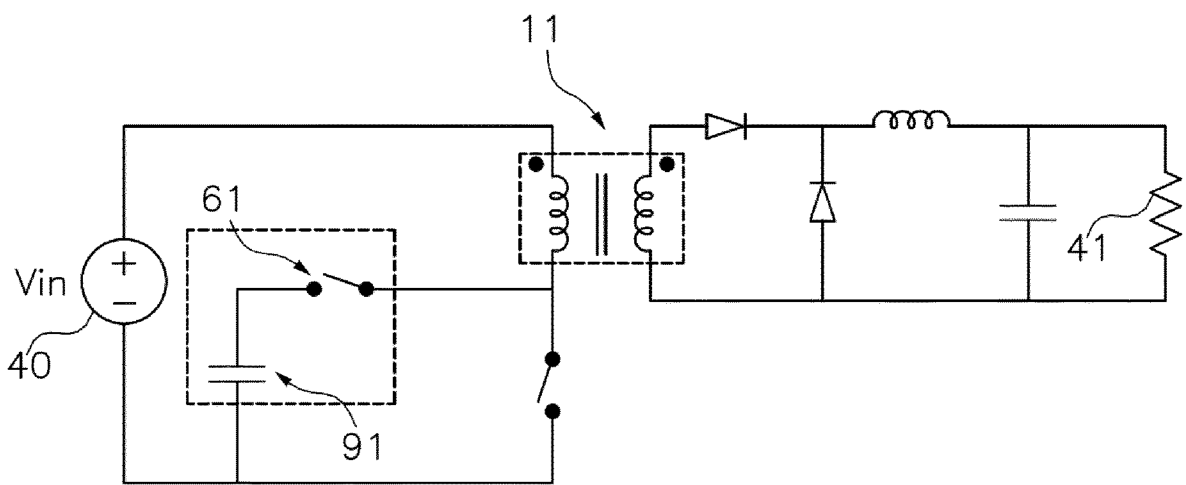
FIG. 2C shows a forward converter including an active clamp.

FIG. 2C shows a forward converter including an active clamp. A forward converter operates the two winding magnetic component as a transformer 11, that is, transferring power through the magnetic component instead of storing and delivering the output power, as the flyback transformer does. The corresponding terminals are placed in the same position as in this invention; however, the invention does not include an output inductor nor a freewheeling rectifier. The output inductor stores and delivers an amount of energy in each switching cycle, termed as “indirect power”. In the invention, however, there is no power processed by an output inductor because there is no output inductor nor freewheeling diode in the circuit. In this specific embodiment of the prior art, an “active clamp” 61, 91 is included, hence the aforementioned advantages described for the active clamp 61, 91 of FIG. 1*b* are obtained.

Figure 3:
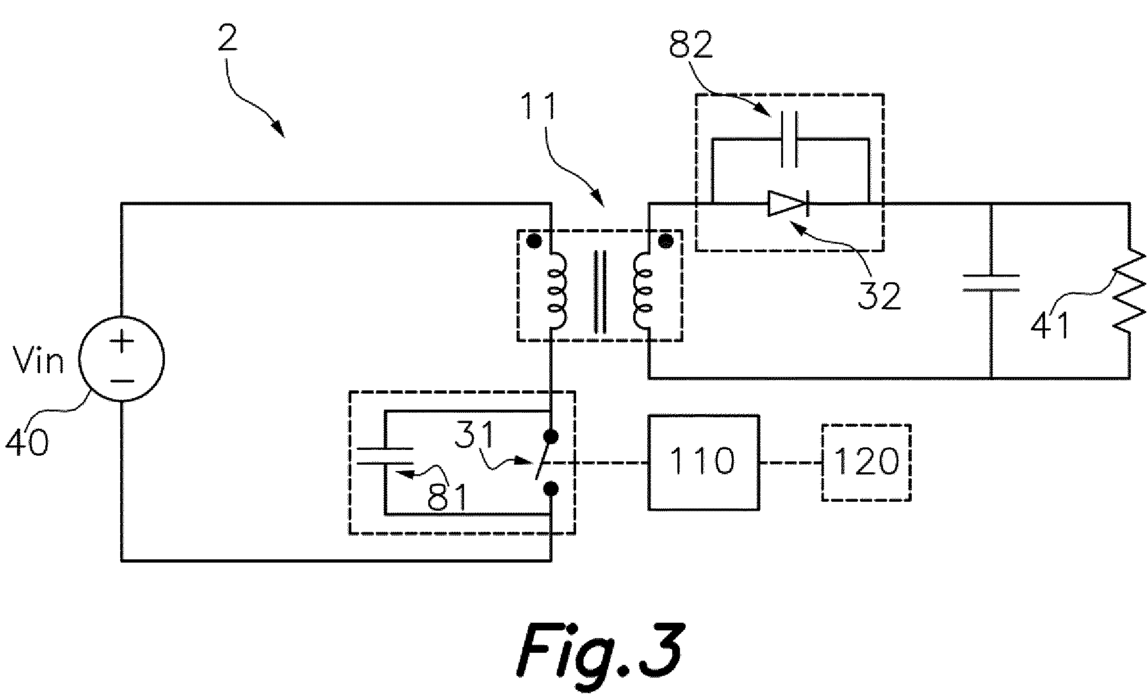
FIG. 3 illustrates an embodiment of the present invention connecting an input port to an output port through a transformer.

FIG. 3 illustrates an embodiment with a very simple implementation of the present invention connecting the input port 40 to the output port 41 through a transformer 11 and including a controlled power switch for the first power switch 31 and a diode for the second power switch 32. The simple embodiment of this invention does not include “active clamp” associated to the first power switch 31 in the primary side nor in the second power switch 32 in the secondary side. Furthermore, it includes a diode instead of a controlled transistor as a second power switch 32. There is a capacitance in parallel 81, 82 with both first (inverting) 31 and second (rectifying) 32 power switches, for proper operation. The first power switch 31 is driven by a driving circuit 110 and optionally controlled by a control unit 120.

Figure 4:
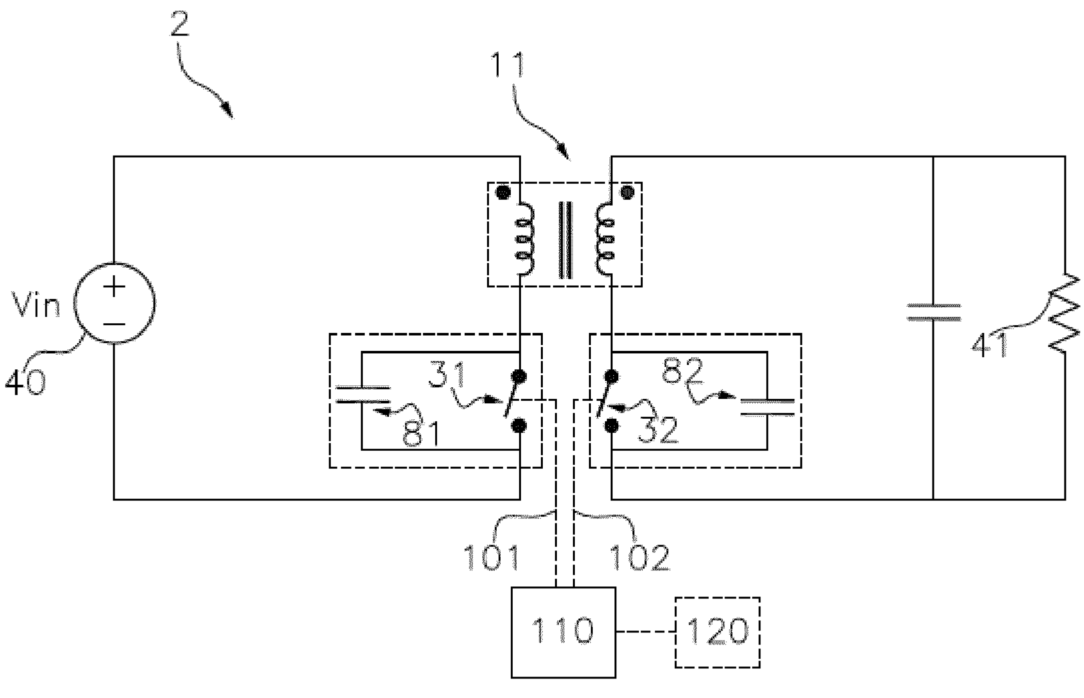

FIG. 4 shows another embodiment of the present invention as in FIG. 3 including controlled power switches both for the first 31 and the second 32 power switches of the invention.

It is similar to the embodiment of FIG. 3, though the second power switch 32 is a controlled transistor instead of a diode. There is a capacitance in parallel 81, 82 with both first (inverting) 31 and second (rectifying) 32 power switches, for proper operation.

The first power switch 31 and the second power switch 32 are driven by a driving circuit 110 including driving terminals 101, 102 and optionally controlled by a control unit 120.

FIGS. 5A, 5B, 5C, 5D illustrate the same embodiment of the FIG. 4 including an active clamp 61, 91, 62, 92 in both first power switch 31 and second power switch 32. More details about these figures are following disclosed.

Figure 5A:
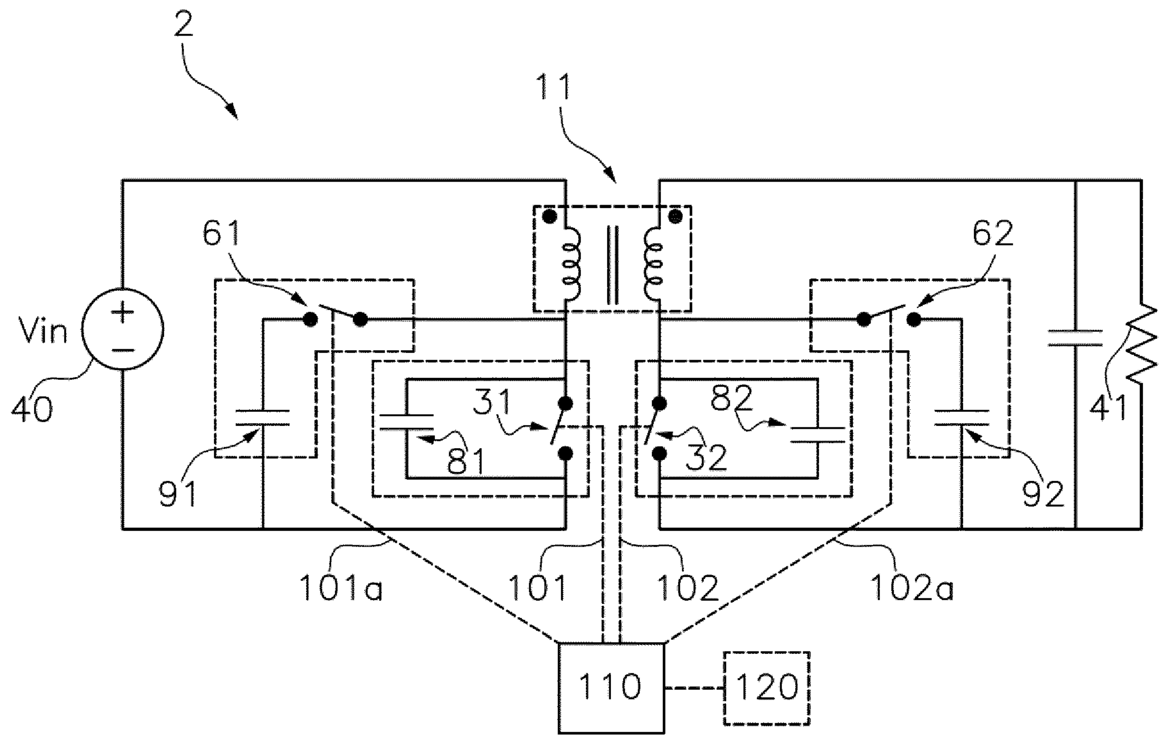
FIGS. 5A, 5B, 5C, 5D illustrate the same embodiment of FIG. 4 including an active clamp.

FIG. 5A shows an embodiment similar to FIG. 4, adding active clamps 61, 91, 62, 92 to both first power switch 31 and second power switch 32.

The active clamps 61, 91, 62, 92 apply a negative voltage to the magnetic component to demagnetize the magnetic core, producing a linear transition of the current flowing through the transformer 11, both in primary and secondary windings. The reset time is a sequence of topological intervals in which both active clamp 61, 91 in the first power switch 31 and active clamp 62, 92 in second power switch 32 are involved, with a phase shift between them.

In steady state, the voltage in each clamp capacitor 91, 92 is adapted so that the mean current flowing through the capacitor 91,92 is zero. This voltage is set automatically and depends on the duty cycle of the power switches 31, 32 and the additional clamping switches 61,62.

These duty cycles can be adjusted to apply the minimum possible voltage to the power switches 31, 32, hence operating them close to their technological voltage limit to minimize RMS current and conduction losses.

Figure 5B:
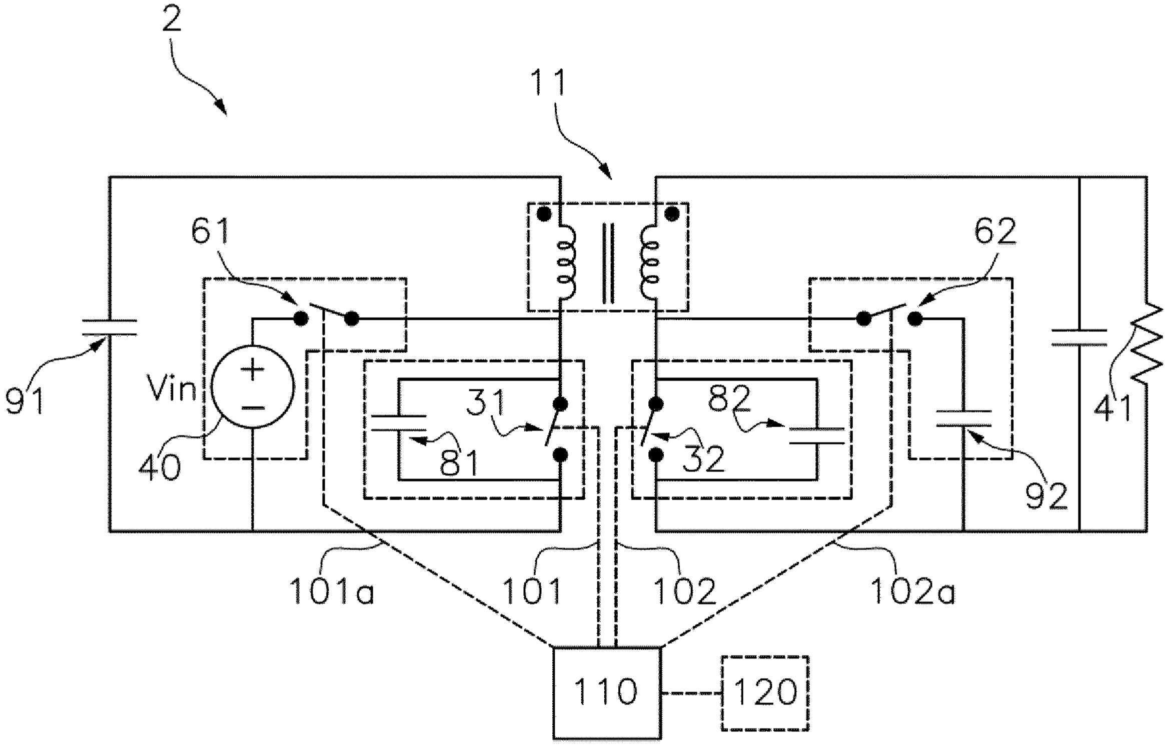

FIG. 5B shows an embodiment similar to FIG. 5A, exchanging the position of the active clamp 61, 91 of the first power switch 31 and the input energy source 40.

Figure 5C:
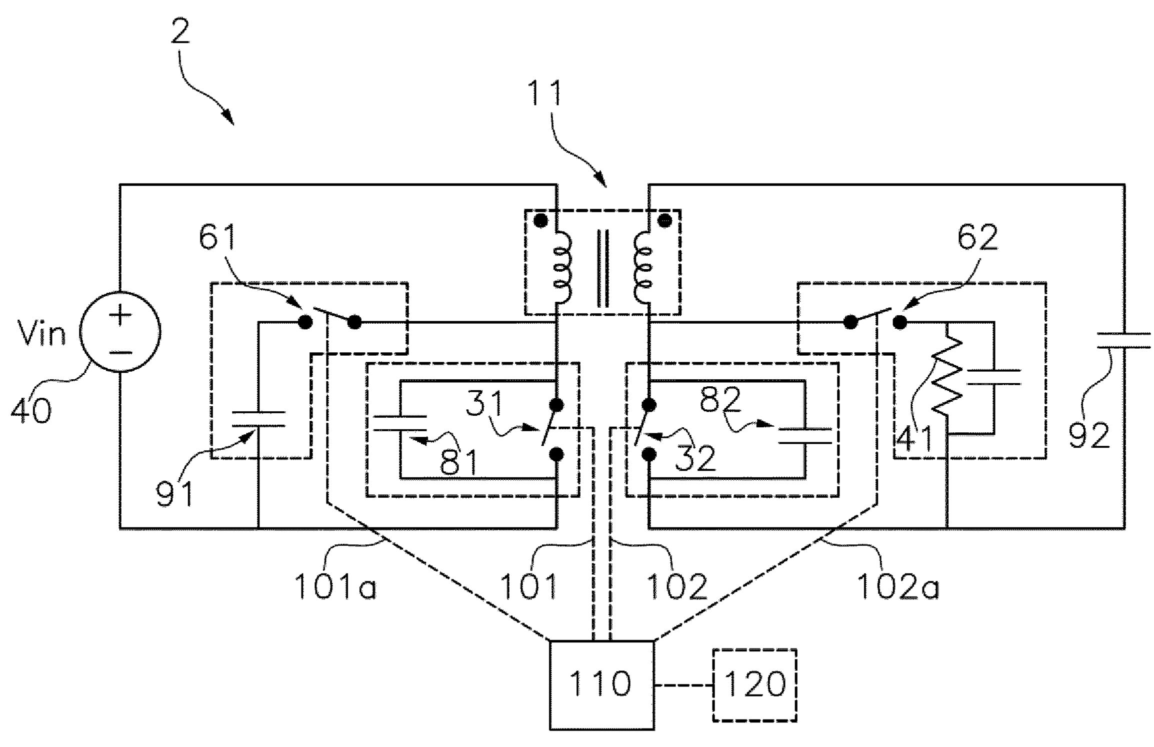

FIG. 5C shows an embodiment similar to FIG. 5A, exchanging the position of the active clamp 62, 92 of the second power switch 32 and the load 41.

The advantage of exchanging the active capacitor clamp networks 61, 91, 62, 92 and the input 40 or output 41 ports is that the maximum voltage applied to the power switches 31, 32 is reduced, therefore power switches 31, 32 rated at lower voltages may be used.

Figure 5D:
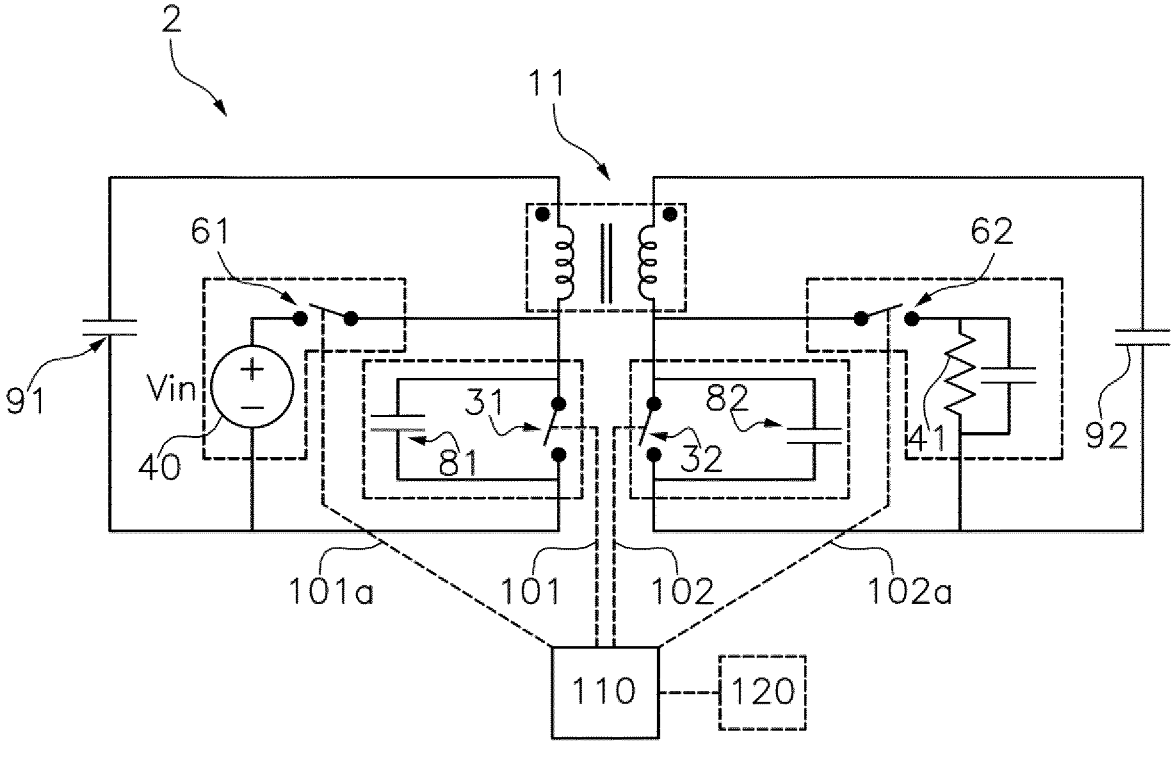

FIG. 5D shows an embodiment similar to FIGS. 5A, 5B and 5C exchanging the position of the active clamp 61, 91 of the first power switch 31 and the input energy source 40 and also exchanging the position of the active clamp 62, 92 of the second power switch 32 and the output load 41.

Figure 5E:
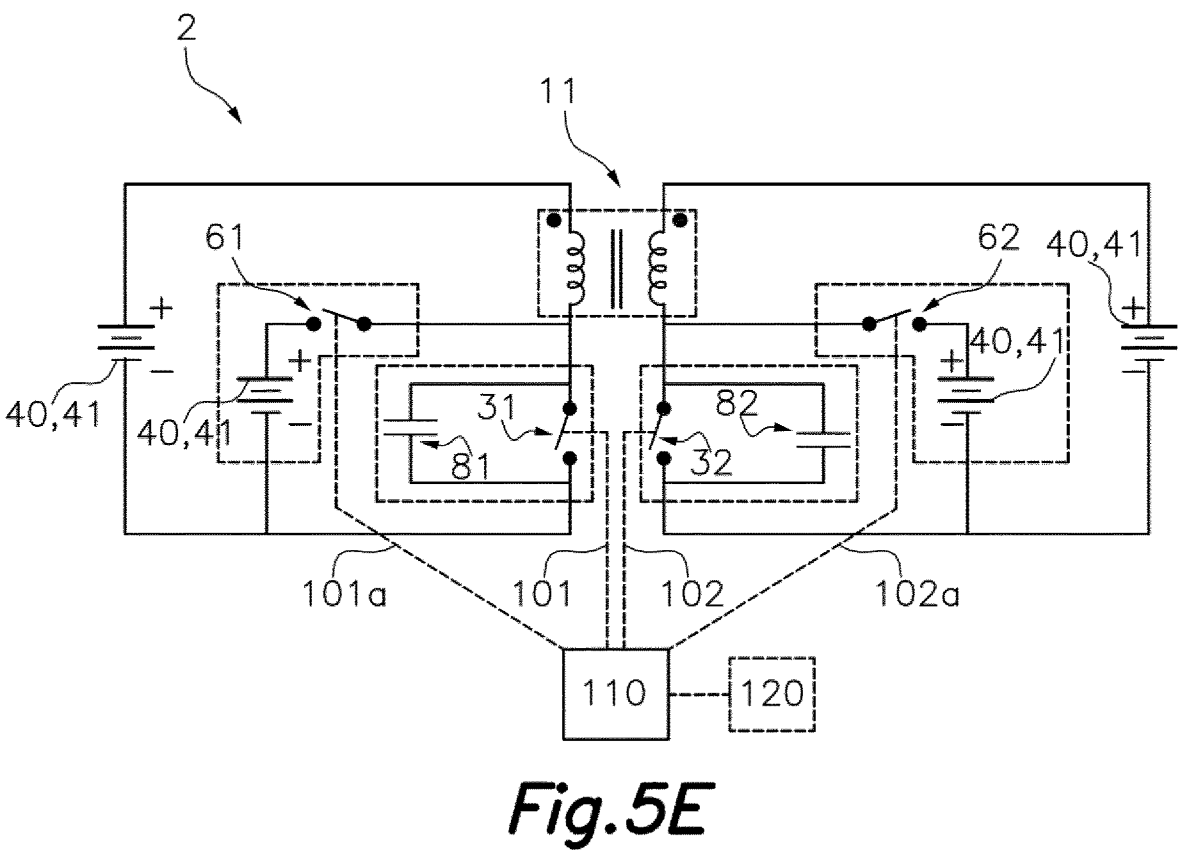
FIG. 5E shows an embodiment similar to FIGS. 5A, 5B, 5C and 5D.

FIG. 5E shows an embodiment similar to FIGS. 5A, 5B, 5C and 5D where four DC ports are explicitly shown in the locations of the input port 40, output port 41, active clamp capacitor 91 in the primary side and active clamp capacitor 92 in the secondary side.

It should be noted that power can flow from one or more of these ports (40,91,41,92) to one or more of the remaining ports (40,91,41,92).

Figure 6A:
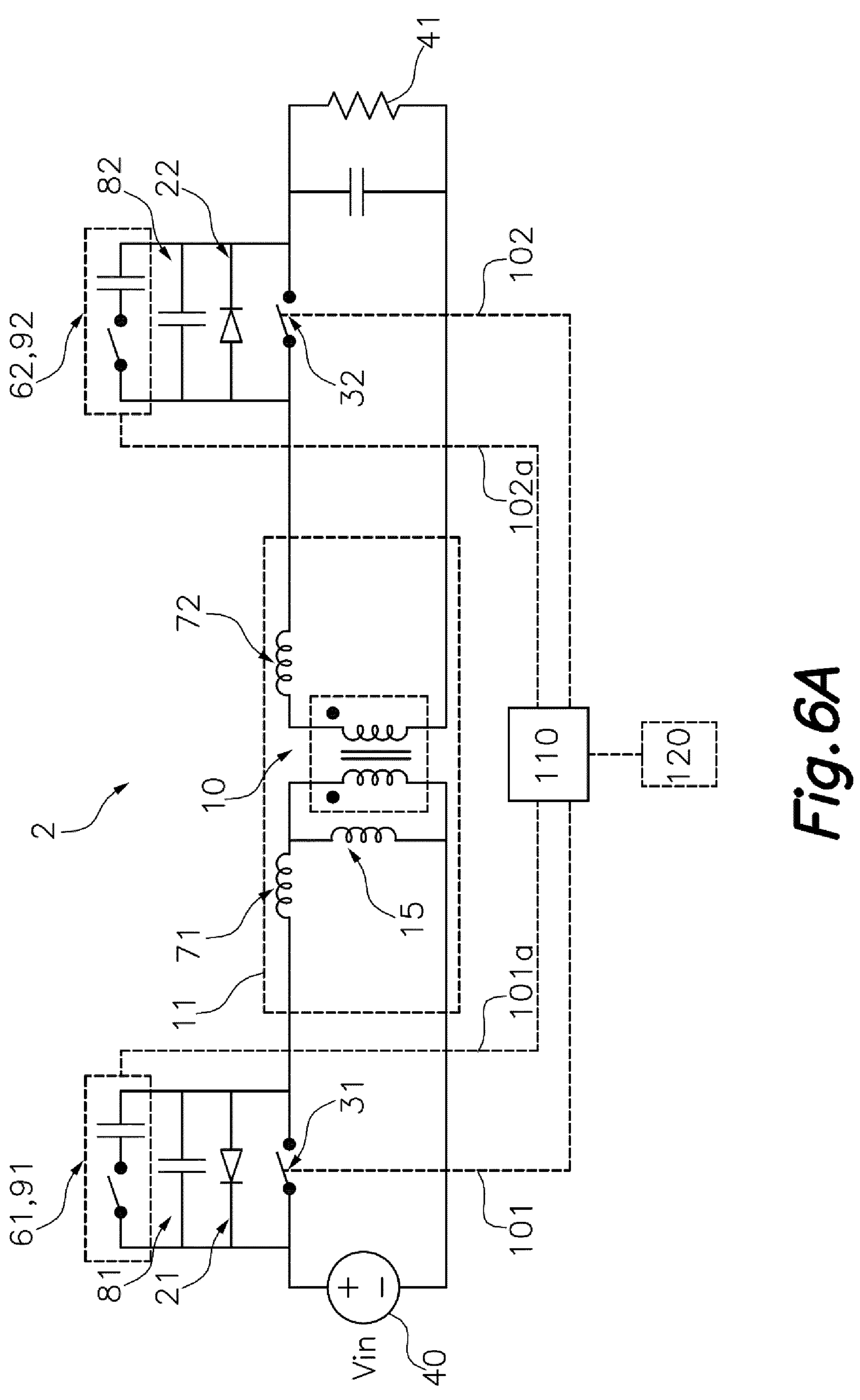
FIG. 6A shows schematically an equivalent circuit for the analysis of this invention.

FIG. 6A shows schematically an equivalent circuit for the analysis of this invention.

This figure is useful to visualize the operation of this invention, by plotting voltage and current in the loops and nodes of the circuit versus time.

Note that in a DC-DC power converter the DC ports typically include a capacitor to filter and stabilize the voltage in the port, even though it is not drawn/shown in parallel with an ideal energy source. Same applies to the load, which typically has a filter capacitor connected in parallel. For the case when we refer to changing the connection of the load from one DC port to another DC port, it refers also to the output capacitor of the port.

Figure 6B:
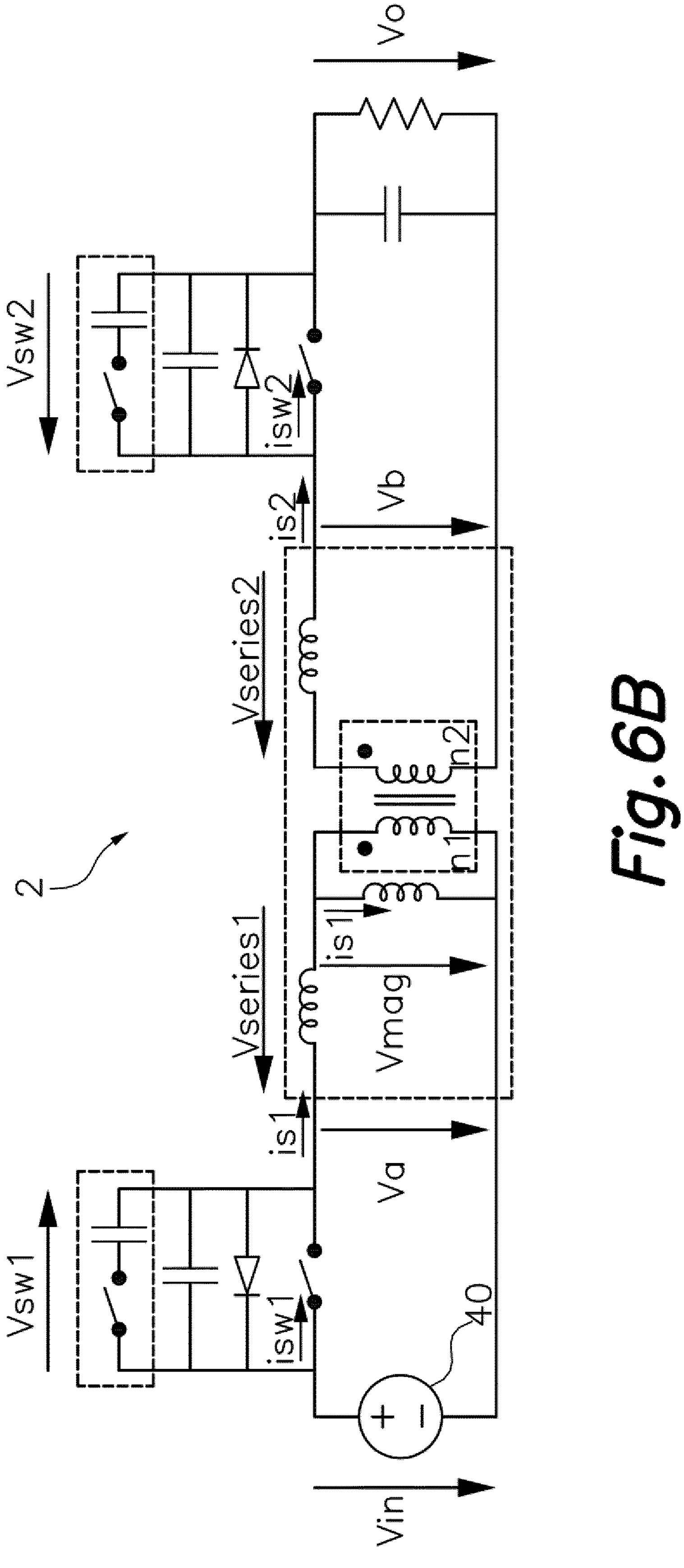
FIG. 6B is equivalent to FIG. 6A including the references for the voltages and currents for the circuit analysis of the invention.

FIG. 6B is equivalent to FIG. 6A, including the references for the voltages and currents for the circuit analysis of the invention.

The reference for the voltages and currents in the loops and nodes of the equivalent circuit are shown in this figure and used to plot the waveforms of the circuit.

FIGS. 7A to 7D show the conducting status intervals used to generate a variety of topological sequences with a transformer reset before a next switching cycle.

Figure 7A:
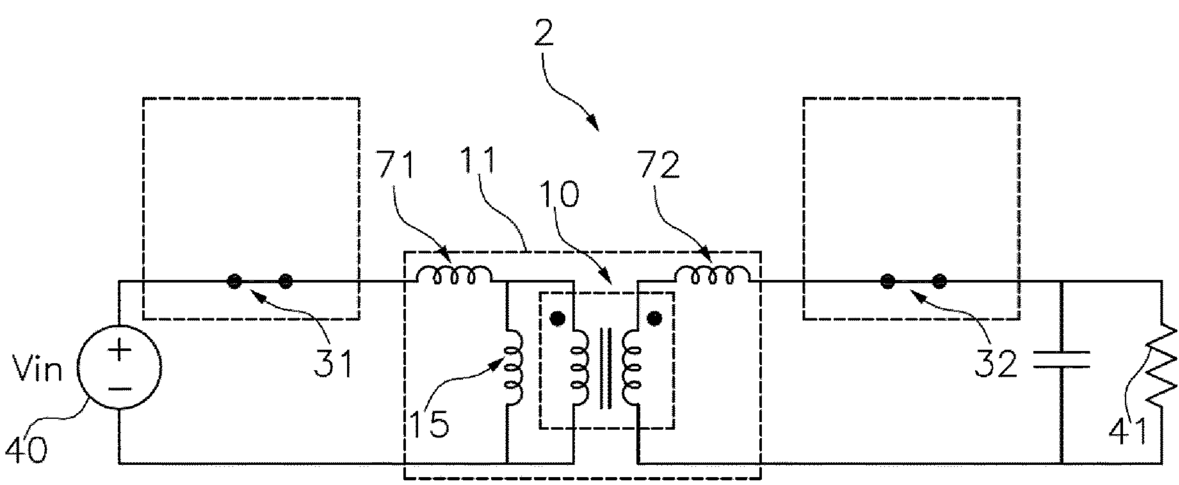
FIGS. 7A, 7B, 7C and 7D show the conducting status intervals used to generate a variety of topological sequences with a transformer reset before a next switching cycle.

FIG. 7A shows the schematic equivalent circuit of this invention for the interval A, being the first power switch 31 in ON state and the second power switch 32 in ON state During this interval A, the current flows both through primary and secondary windings of the transformer 11. There is direct power flow from the input energy source 40 to the load 41, through the transformer 11. The conduction losses in the power converter are reduced by increasing the time duration of this interval A because the RMS values of the currents, both in primary and secondary sides, are reduced.

The magnetic component is magnetized during this direct conducting status interval A.

Figure 7B:
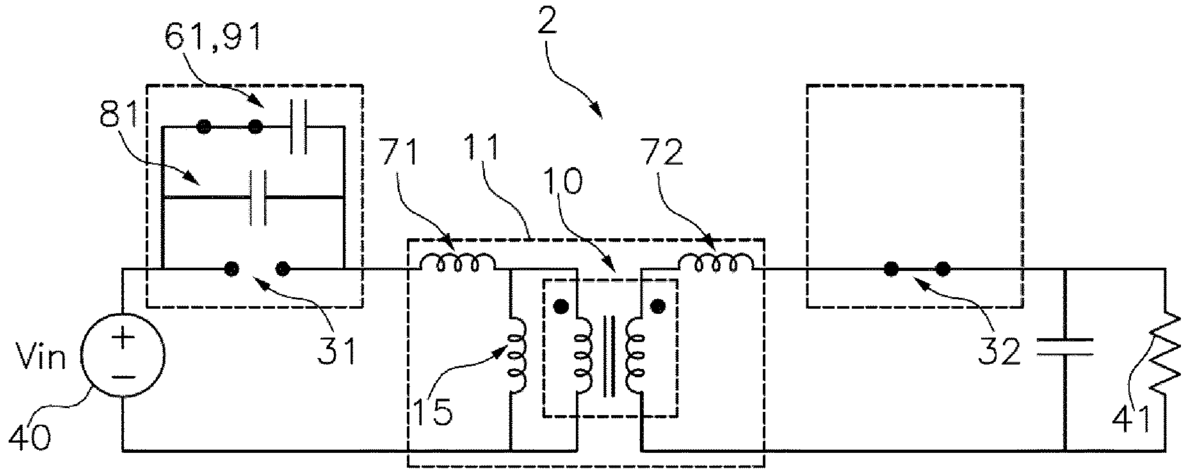

FIG. 7B shows the schematic equivalent circuit of this invention for the interval B, being the first power switch 31 in OFF state and the second power switch 32 in ON state.

During this interval a negative voltage is applied to the magnetic component 11, contributing to reset the magnetic component 11. The currents flowing through both primary and secondary windings decrease.

Figure 7C:
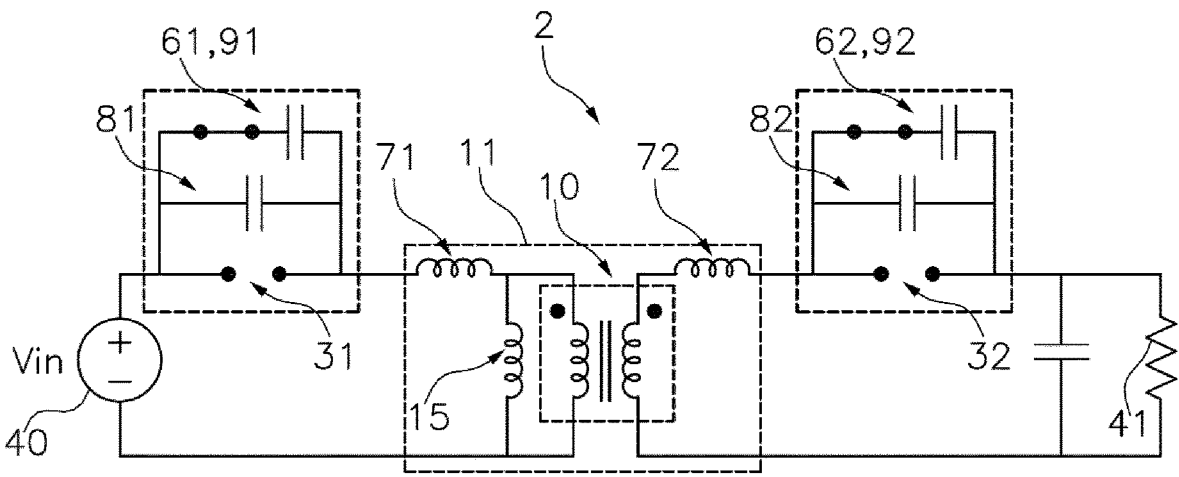

FIG. 7C shows the schematic equivalent circuit of this invention for the interval C, being the first power switch 31 in OFF state and the second power switch 32 in OFF state.

During this interval a negative voltage is applied to the magnetic component 11, contributing to reset the magnetic component 11.

Figure 7D:
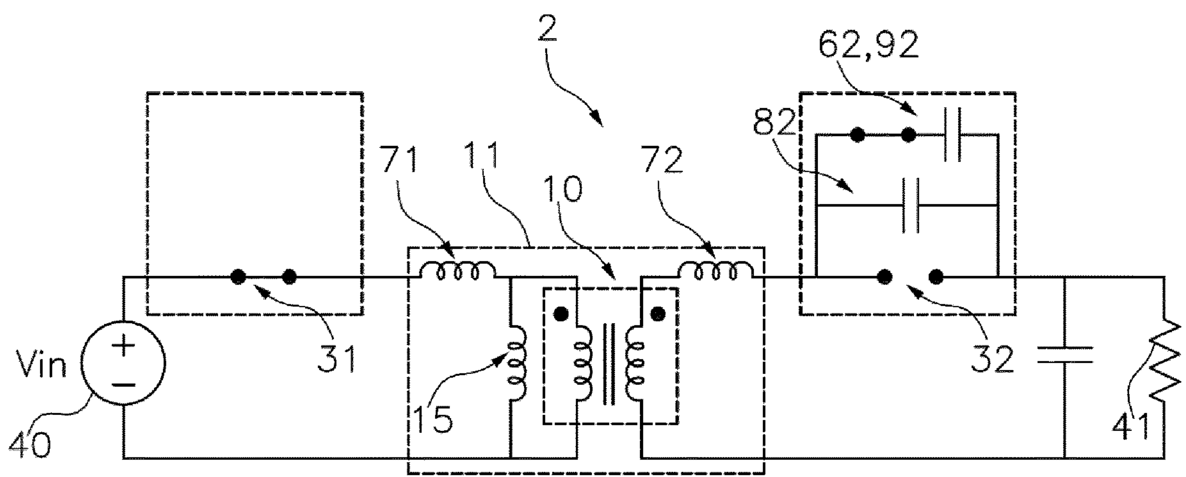

FIG. 7D shows the schematic equivalent circuit of this invention for the interval D, being the first power switch 31 in ON state and the second power switch 32 in OFF state.

During this interval a negative voltage is applied to the magnetic component 11, contributing to reset the magnetic component 11. The currents flowing through both primary and secondary windings increase.

FIGS. 8 to 13 are a few of the multiple possible representative sets of electrical waveforms of the schematic equivalent circuit of the invention under different operating conditions.

Figure 8:
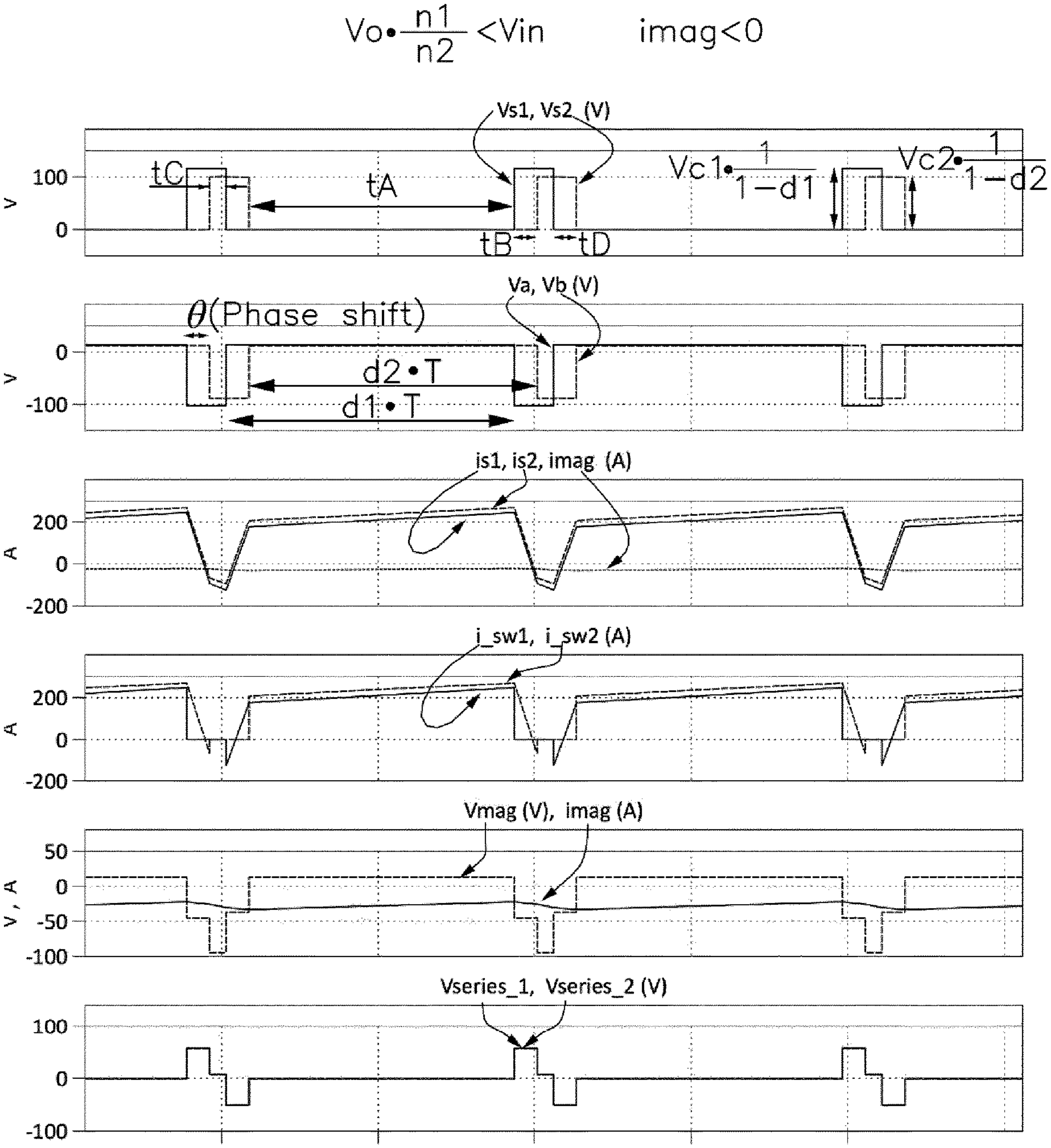
FIGS. 8, 9, 10, 11, 12 and 13 are a few of the multiple possible representative sets of electrical waveforms of the schematic equivalent circuit of the invention under different operating conditions.

FIG. 8 key waveforms defining circuit operation for the schematic equivalent circuit including active clamp 61, 91, 62, 92 in both power switches 31, 32 for the sequence A-B-C-D, for a transformer turns ratio equal to one ($n_1=n_2$) and "direct conduction time", that is, interval A, lasting higher than 50% of the switching period.

The first set of waveforms starting from the top shows the voltages in both power switches 31, 32. It should be noted that there is a phase shift between the conduction times of the first 31 and second 32 power switches. The peak voltage in each power switch 31, 32 is determined by the voltage in each clamp capacitor 91, 92, which is set by adjusting the duty cycle of the power switch 31, 32 and the clamping switch 61, 62. The time duration of intervals A, B, C and D are indicated in the figure.

The second set of waveforms starting from the top shows the voltages in both primary and secondary windings. They are consistent with previous waveforms. The phase shift and conduction duty cycles of both first 31 and second 32 power switches are indicated in the waveforms.

The third set of waveforms starting from the top shows the currents in both primary and secondary windings and the magnetizing current. Note that in these specific operating conditions the magnetizing current is smaller than the current in the windings.

The timing of the driving signals of the power switches 31, 32 can be set to have a high "direct conduction time", $t_A$, hence reducing the RMS value of the current flowing through both windings, said "direct conduction time" can be higher than 50%.

The difference between both currents equals the magnetizing current. Therefore, both currents are approximately equal if the magnetizing current is small compared to the currents flowing through the windings. In this figure, the magnetizing current is slightly negative, though small compared to the current flowing through the windings, to emphasize the concept, During the interval A, that is, during the "direct conduction time", $t_A$:

- The slope of these currents is zero for the case that the output voltage referred to the primary winding is equal to the input voltage ($n_1/n_2 \cdot V_o = V_{in}$), assuming that the magnetizing current is small (negligible) compared to the currents flowing through the windings
- The slope of these currents is positive for the case that the output voltage referred to the primary winding is lower than the input voltage ($n_1/n_2 \cdot V_o < V_{in}$), assuming that the magnetizing current is small compared to the currents flowing through the windings
- The slope of these currents is negative for the case that the output voltage referred to the primary winding is higher than the input voltage ($n_1/n_2 \cdot V_o > V_{in}$), assuming that the magnetizing current is small compared to the currents flowing through the windings The fourth set of waveforms starting from the top shows the currents in both first power switch 31 and second power switch 32.

These currents are equal to the corresponding currents flowing through the windings of the transformer 11, for the time the power switch 31, 32 is in conducting ON state.

The fifth set of waveforms starting from the top shows the voltage and current in the magnetizing inductance 15. It should be noted that the voltage is positive during interval A and negative during intervals B, C and D. It should be noted that the magnetizing current in this case is negative because the output voltage referred to the primary winding is lower than the input voltage ($n_1/n_2 \cdot V_o < V_{in}$).

The sixth set of waveforms starting from the top shows the voltage in the series inductances 71, 72. It should be noted that both voltages are equal under these operating conditions because $L_{series1}=L_{series2}$ and $n_1=n_2$. When the voltage in the series inductances 71, 72 is positive according to the selected reference in the embodiment of FIG. 6B the current in the winding decreases, whereas when the voltage in the series inductances 71, 72 is negative, the current in the winding increases.

Figure 9:
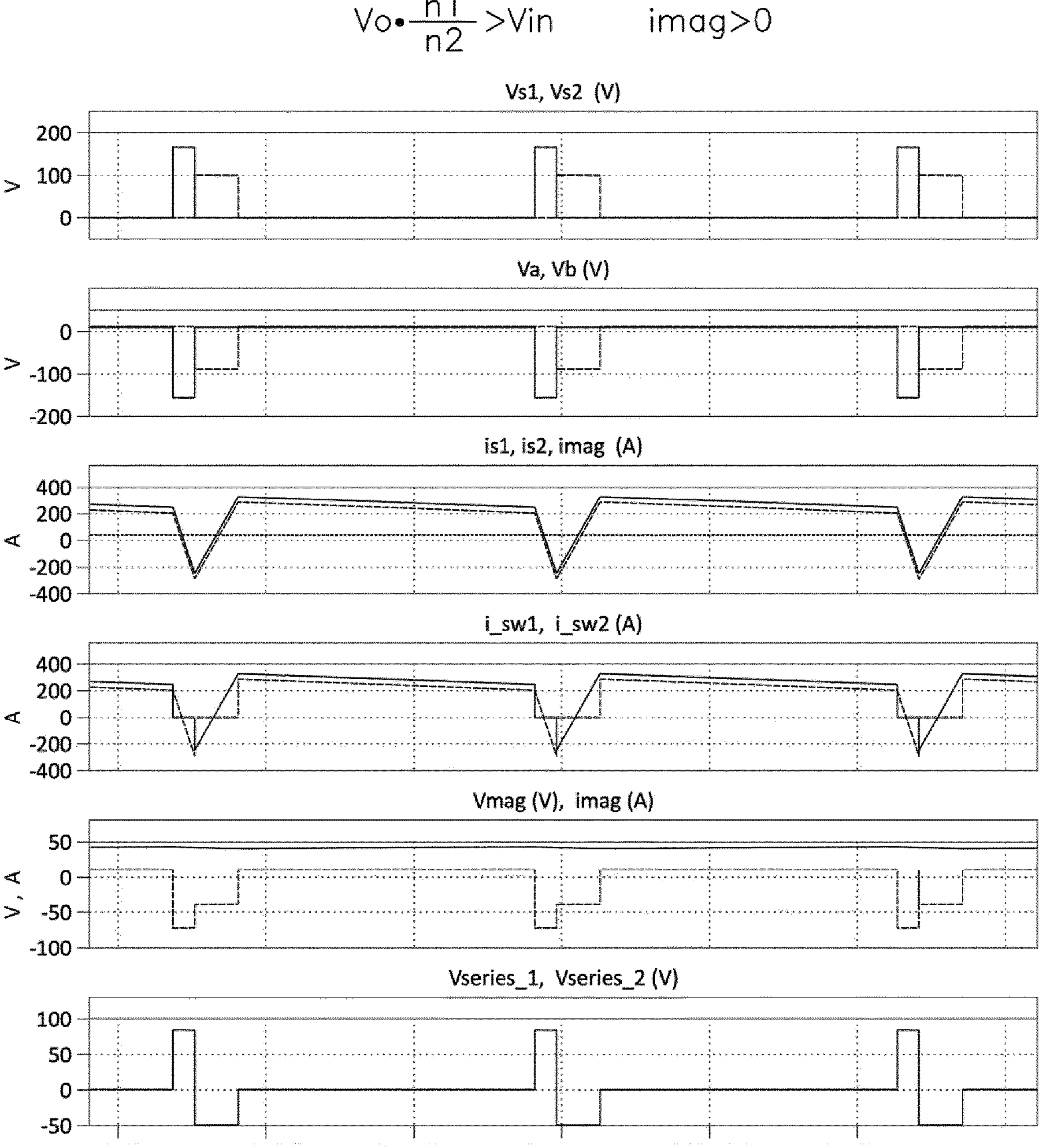

FIG. 9 key waveforms defining circuit operation for the schematic equivalent circuit including active clamp 61, 91, 62, 92 in both power switches 31, 32 for the sequence A-B-D for a transformer turns ratio equal to one and $n_1/n_2 \cdot V_o > V_{in}$. FIG. 9 shows the same waveforms that FIG. 8, except for the fact that the phase shift is adjusted to eliminate interval C, hence reducing the RMS value of the current flowing through both primary and secondary windings. Another difference is that the output voltage referred to the primary winding is higher than the input voltage ($n_1/n_2 \cdot V_o > V_{in}$) hence the slope of the currents flowing through the windings during interval A is negative and the magnetizing current is positive.

Figure 10:
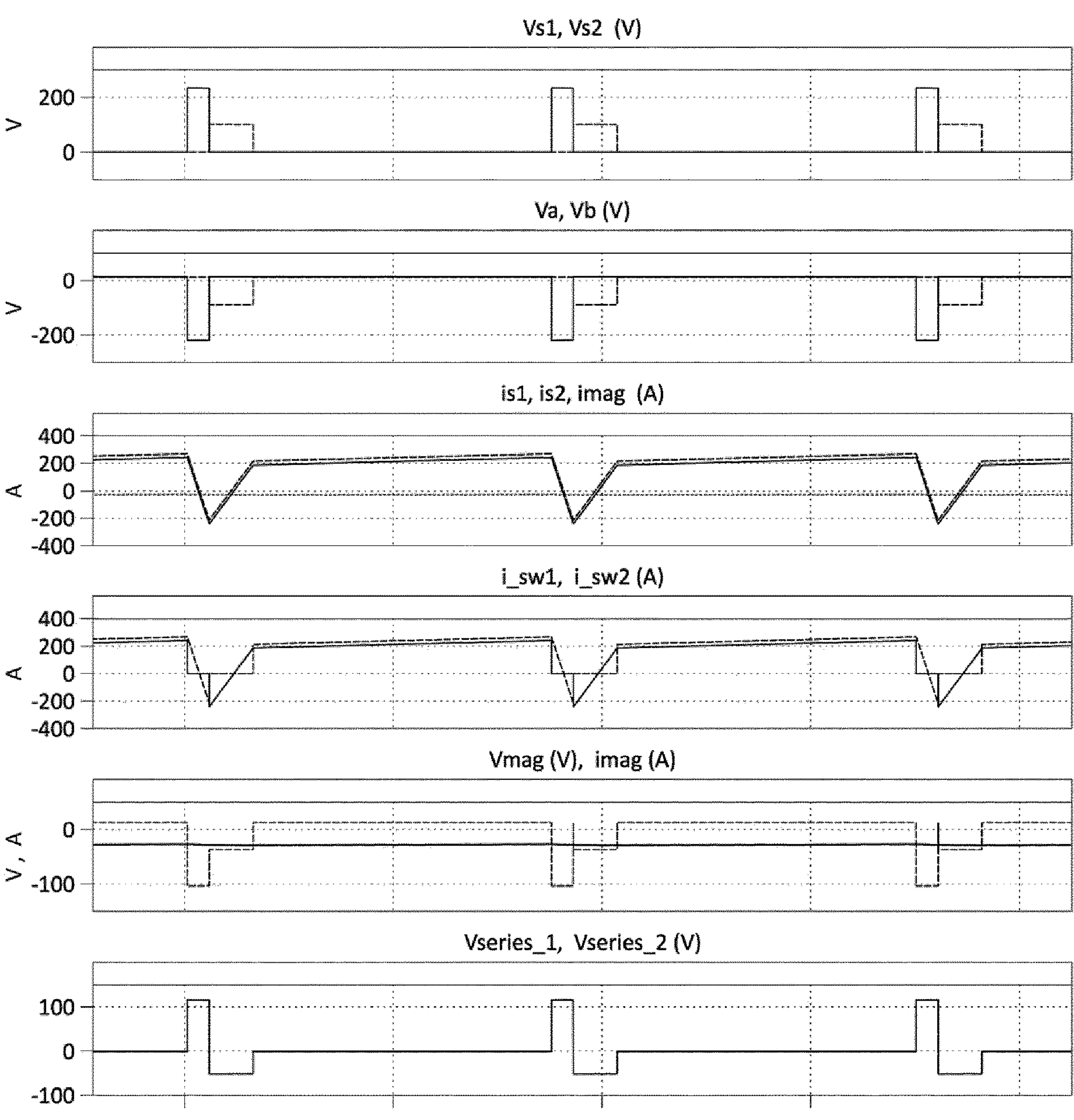

FIG. 10 key waveforms defining circuit operation for the schematic equivalent circuit including active clamp 61, 91, 62, 92 in both power switches 31, 32 for the sequence A-B-C-D adjusting the maximum voltage applied to the power switches 31, 32 for a transformer turns ratio equal to one and $n_1/n_2 \cdot V_o < V_{in}$. Note that FIG. 10 shows the same waveforms that FIG. 9, except for the fact the output voltage referred to the primary winding is lower than the input voltage ($n_1/n_2 \cdot V_o < V_{in}$) hence the slope of the currents flowing through the windings during interval A is positive and the magnetizing current is negative.

Figure 11:
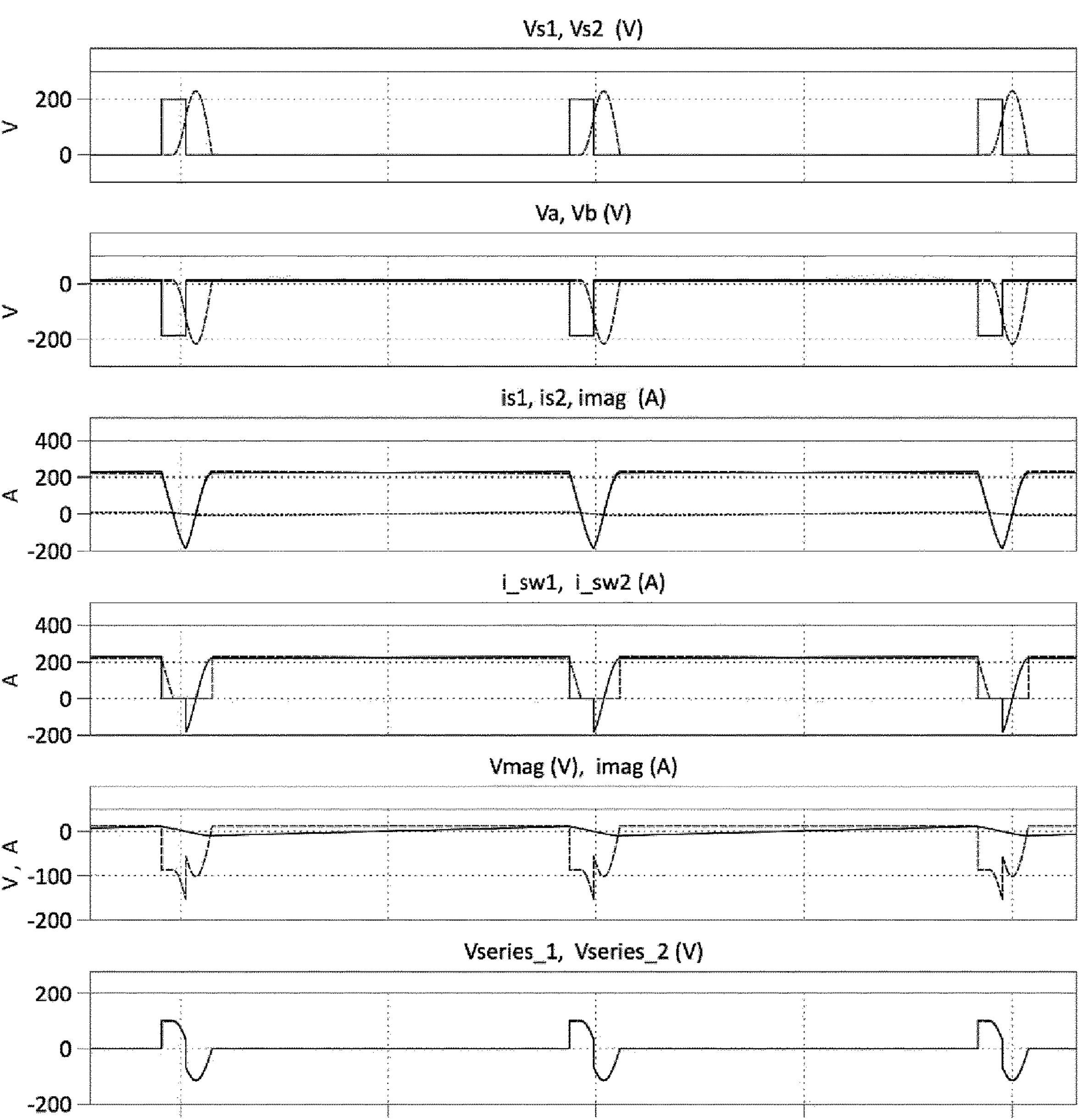

FIG. 11 key waveforms defining circuit operation for the schematic equivalent circuit including active clamp 61, 91 only in first power switch 31 (inverting) for the sequence A-B-C-D, for a transformer turns ratio equal to one and $n_1/n_2 \cdot V_o = V_{in}$. Note that FIG. 11 shows the same waveforms that FIG. 10, except for the fact that the clamp network 62, 92 has been eliminated in the second power switch 32 hence the voltage in the capacitance 82 in parallel with the second power switch 32 resonates. Voltage and current waveforms become sinusoidal instead of linear during intervals C and D.

Note that the function of the capacitance in parallel with the power switch is to provide a voltage to reset the transformer. When an active clamp is used, the value of the capacitor is such that its voltage remains constant during its operation within the switching cycle. However, when an active clamp is not used, the value of the capacitance is selected so that its voltage resonates with the transformer during the Off time within each switching cycle. This is the reason why the waveforms in FIG. 11 include sinusoidal intervals whereas in FIG. 10 includes all the intervals are linear.

Figure 12:
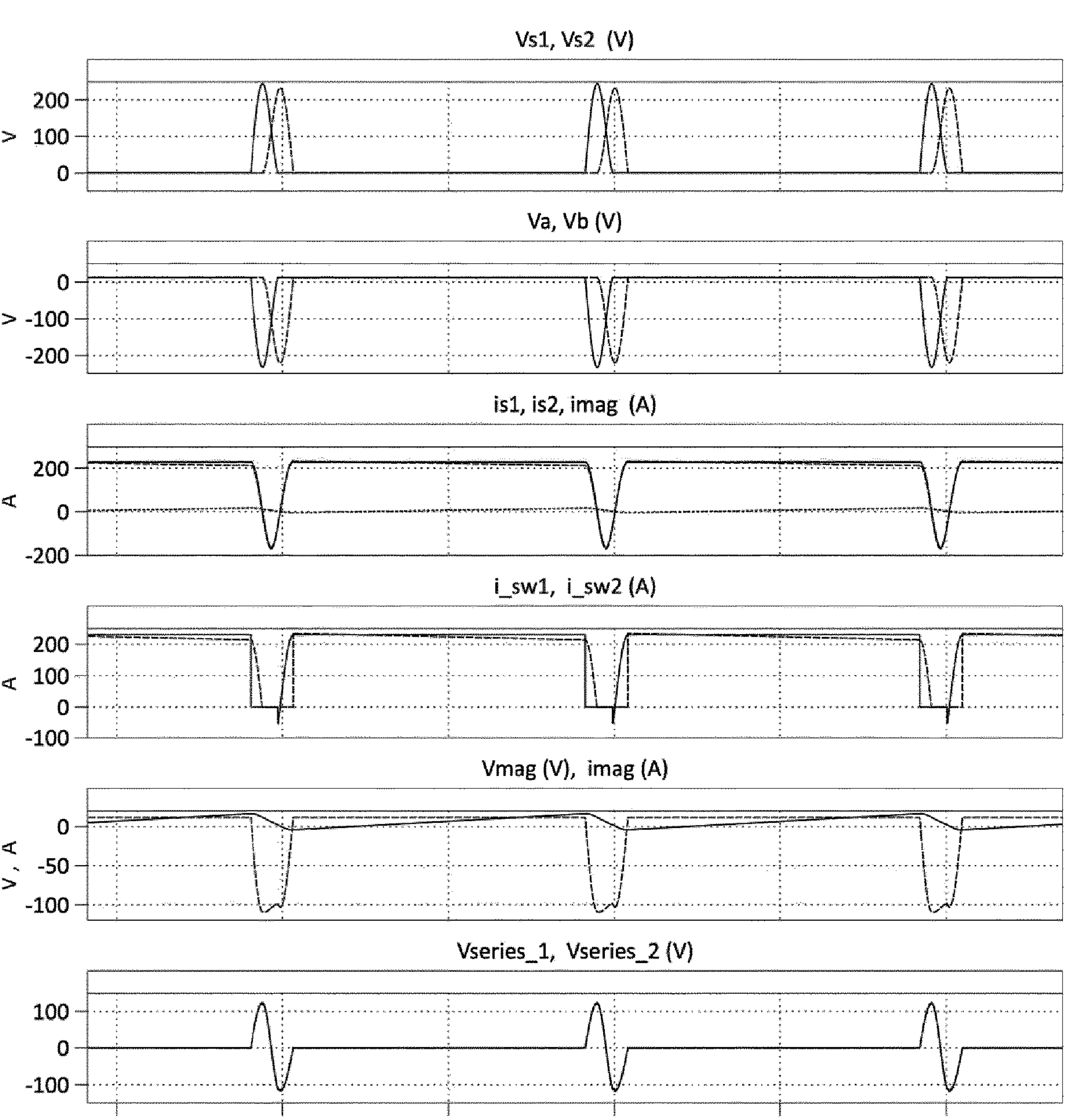

FIG. 12 key waveforms defining circuit operation for the schematic equivalent circuit without active clamps in the power switches 31, 32, for the sequence A-B-C-D, for a transformer turns ratio equal to one and $n_1/n_2 \cdot V_o = V_{in}$. Note that FIG. 12 shows the same waveforms that FIG. 11, except for the fact that the clamp network 61, 91 has been eliminated also in first power switch 31 hence the voltage in the capacitance 81 in parallel with the first power switch 31 also resonates. Note that voltage and current waveforms become sinusoidal instead of linear during intervals B, C and D.

Figure 13:
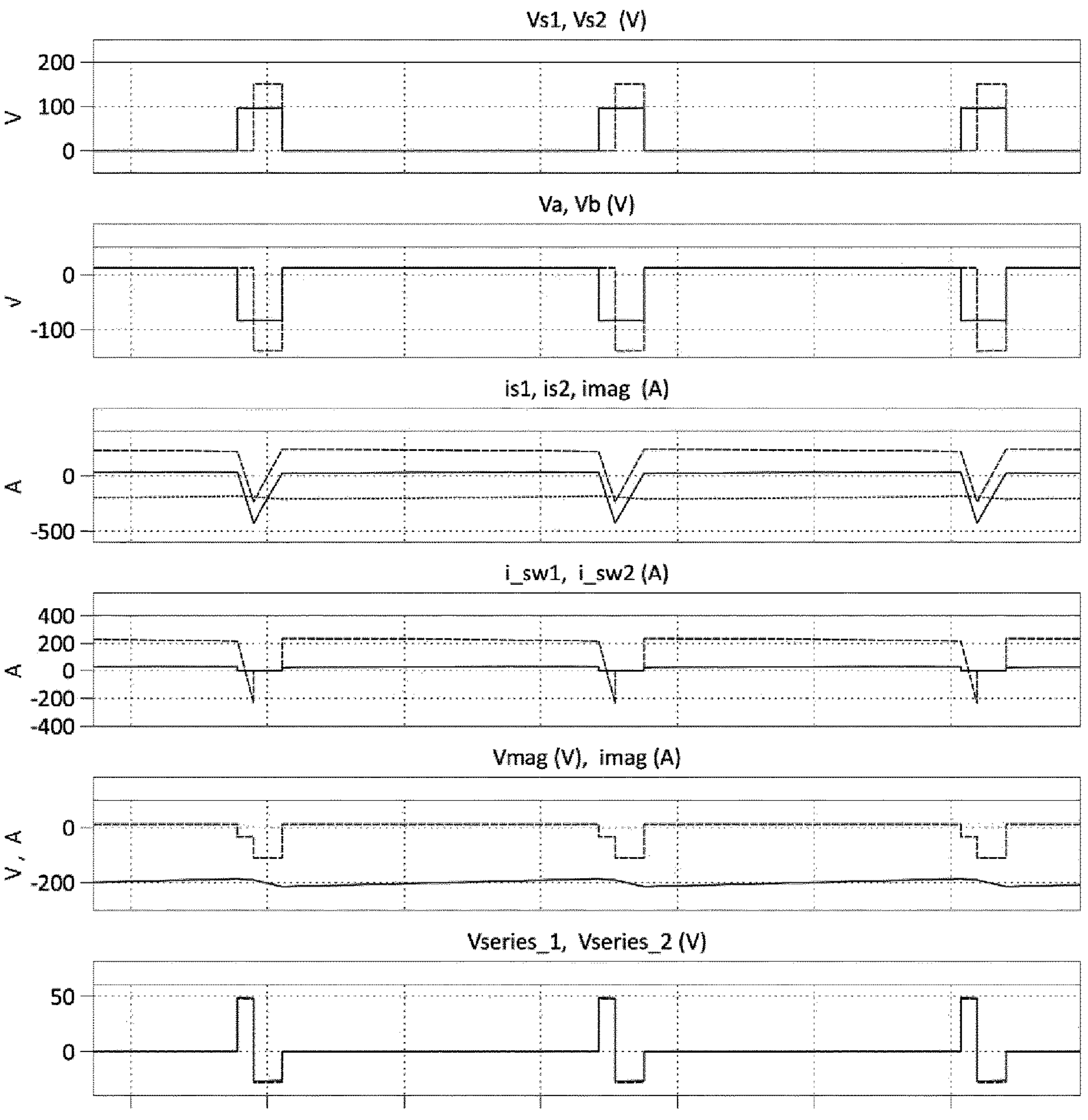

FIG. 13 shows key waveforms defining circuit operation for the schematic equivalent circuit where the first clamp capacitor (91) and the energy source of the input port are exchanged.

In this configuration, all intervals A, B, C, D are defined in the same manner, just exchanging the energy source and the clamp capacitor. As an example, interval A refers to the "direct conduction time" where power flows from the clamp capacitor (91) to the load (41).

A significant difference with previous waveforms is the mean value of the current flowing by the ports, which equals zero in the clamp capacitor and equals the mean input current of the DC-DC converter in the port where the energy source is connected. Therefore, the mean value of the current in the primary winding is zero, whereas the mean value of the current in the secondary winding is the output current of the converter. As in all the previous operation modes, the mean value of the magnetizing current is equal to the difference between the mean value of the current in primary and secondary windings.

Figure 14:
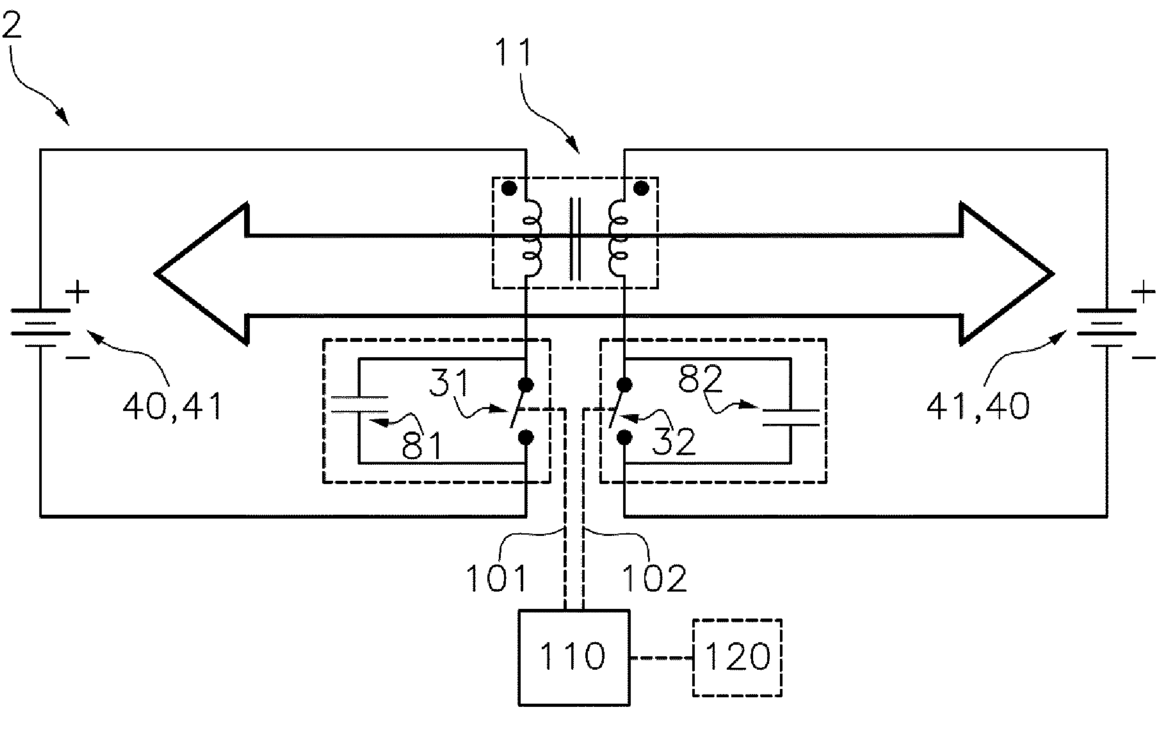
FIG. 14 shows another embodiment of this invention with bidirectional power flow between primary port and secondary port.

FIG. 14 shows another embodiment of this invention with bidirectional power flow between primary port and secondary port.

The power converter is bi-directional hence the power may flow in either direction depending on the ports where the input energy source (40) and load (41) are connected. If both ports are connected to bi-directional dipoles, like batteries or other bi-directional DC-DC converters, the direction of the power flow is determined by the phase shift between the driving signals FIGS. 15A, 15B and 15C show other embodiments of this invention.

Figure 15A:
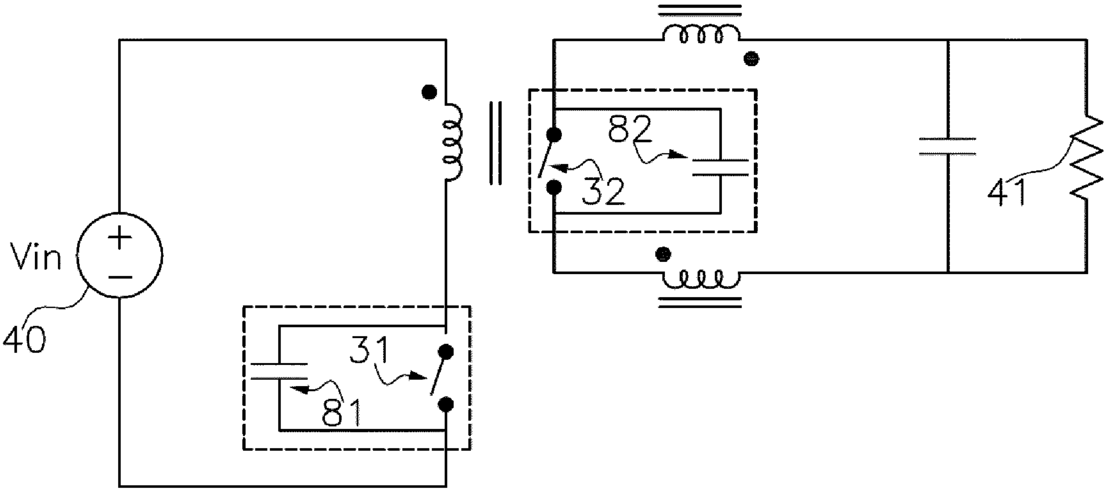
FIGS. 15A, 15B and 15C show other embodiments of this invention.

FIG. 15A shows the secondary winding is "segmented", configuring a Segmented Winding as described in WO2021105369, wherein the second power switch 32 is inserted between two conductors forming the secondary loop since these two conductors are connected to the output capacitor. The Segmented Winding concept can be similarly configured in the primary side of the power converter.

Figure 15B:
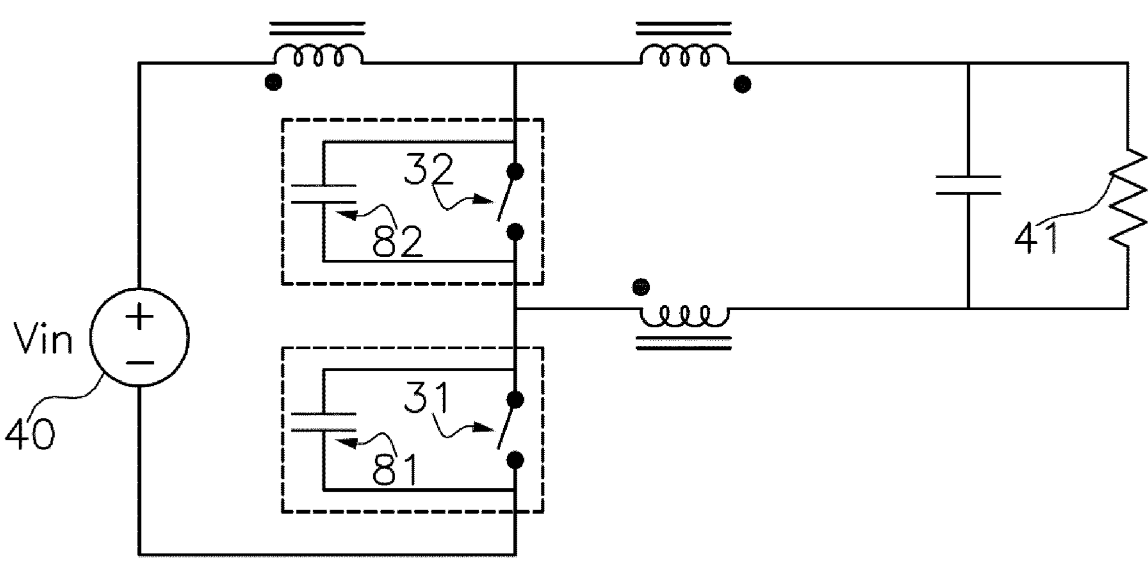

FIG. 15B illustrates another embodiment based on the embodiment of FIG. 15A, replacing the transformer by an autotransformer. This configuration enables direct power flow from input energy source (40) to the load (41) without being processed by the magnetic component, wherein a partial power processing configures a "partial power" DC-DC converter.

Figure 15C:
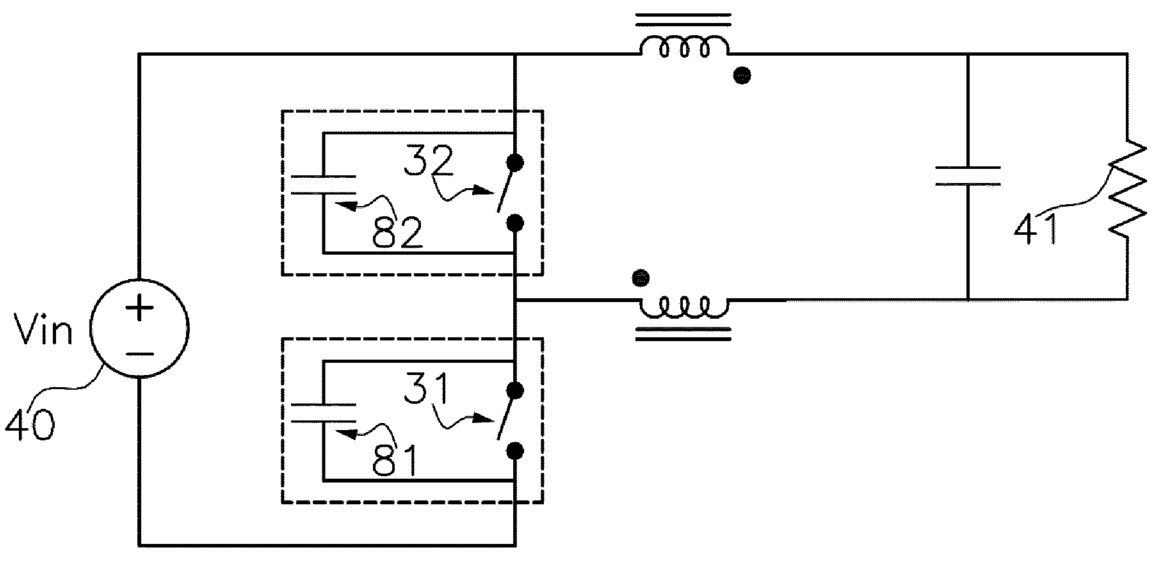
Figure 16:
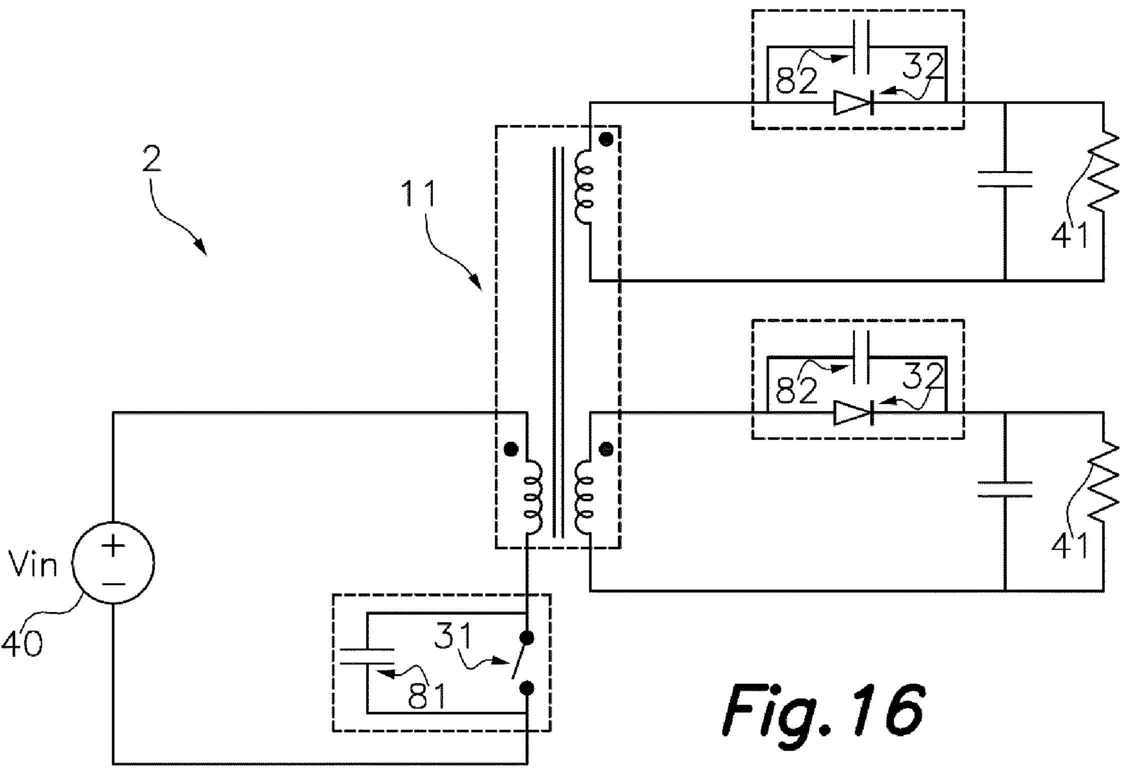
FIG. 16 shows another embodiment of this invention including additional secondary windings enabling a multiple output power converter.

FIG. 15C shows another embodiment based on the embodiment of FIG. 15B, eliminating the primary winding of the magnetic component, configuring a "Buck converter with segmented windings". In this embodiment, the energy supplied to the output port comes from the magnetizing inductance of the magnetic component as well as from the energy source FIG. 16 shows another embodiment of this invention including additional secondary windings enabling a multiple output power converter. Multiple secondary windings with different number of turns enable power flow to multiple loads at different voltages.

Figure 17:
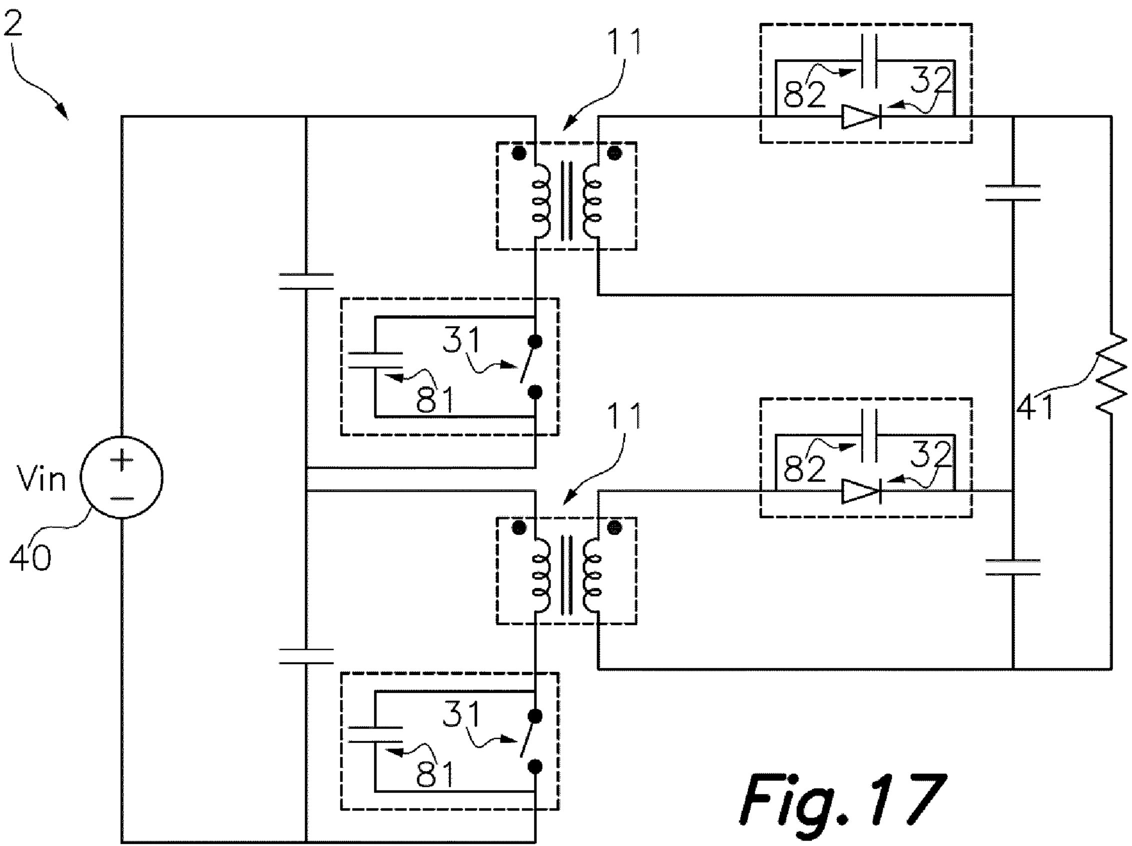
FIG. 17. shows another embodiment of this invention including additional stacked modules enabling a multi-level power converter.

FIG. 17 shows another embodiment of this invention including additional stacked modules enabling a multi-level power converter. Stacking multiple levels enable the utilization of power switches (31, 32) in primary side and or in secondary side rated at lower breakdown voltages.

Figure 18:
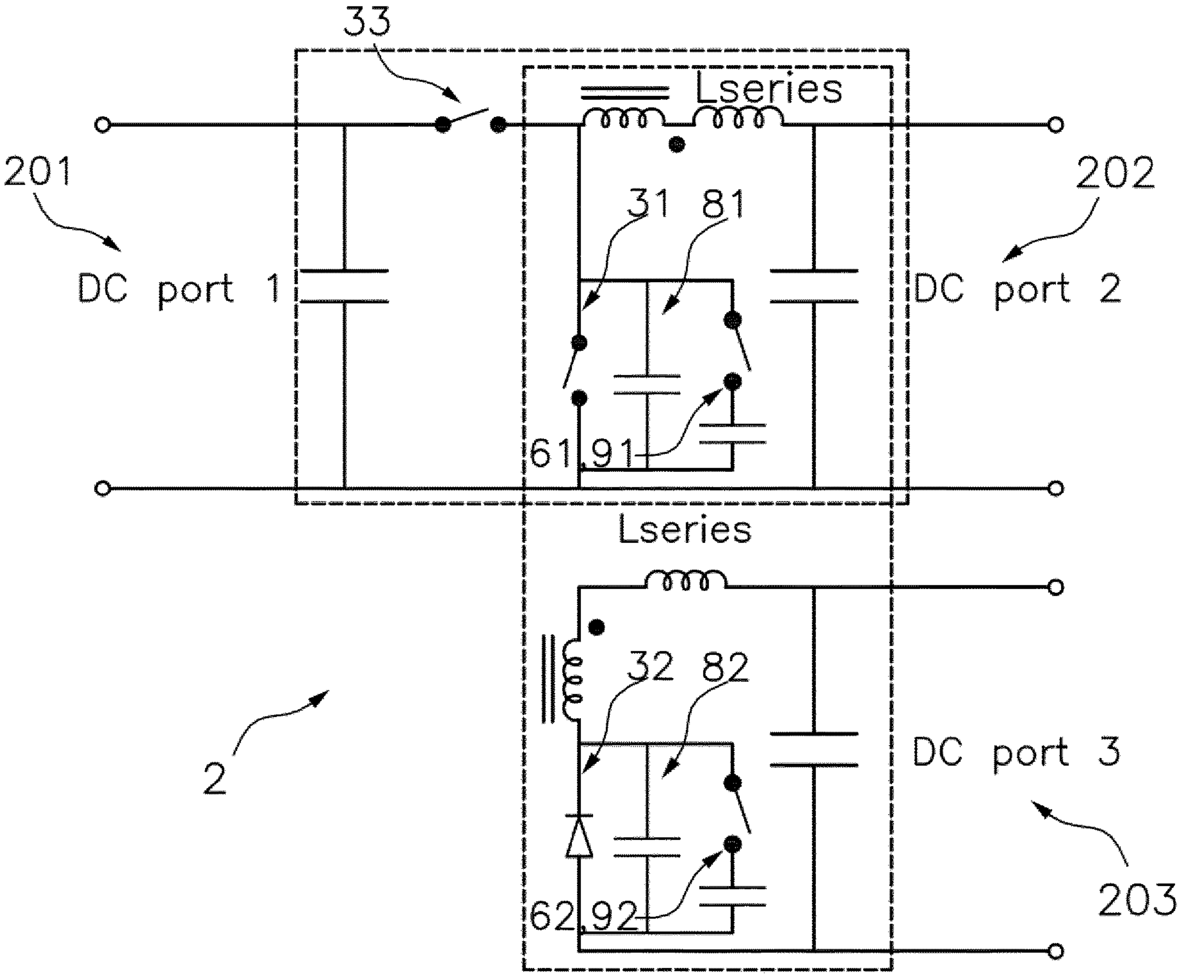
FIG. 18 show an electrical power converter comprising the integration of a Buck converter with a DPX converter of this invention.

FIG. 18 shows an electrical power converter comprising the integration of a Buck converter with a DPX converter of this invention, forming a three port Buck-DPX regulated converter as done in the WO2021094077A1.

Figure 19:
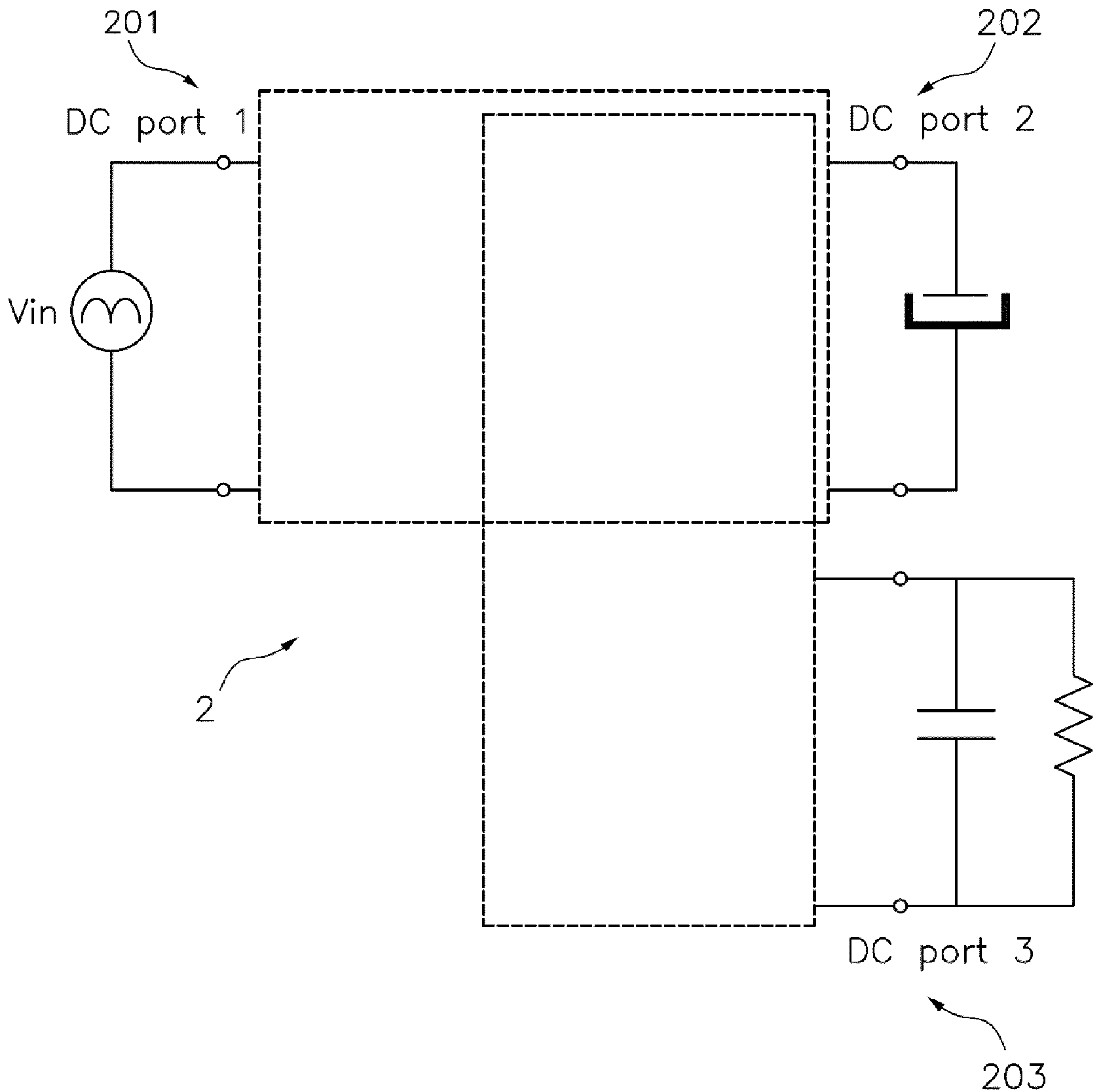
FIG. 19 shows the Three-port Buck-DPX converter operated as an "Energy buffered AC-DC power converter".

FIG. 19 shows the Three-port Buck-DPX converter operated as an "Energy buffered AC-DC power converter" in which port 2 is the energy buffer, port 1 is the rectified AC voltage and port 3 is the DC load.

Figure 20A:
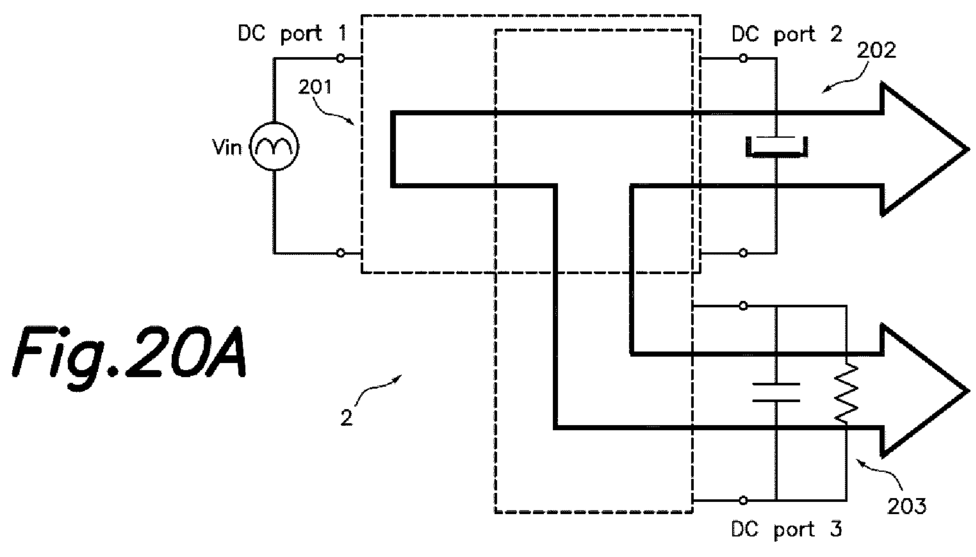
FIG. 20A shows the 3-port power converter of FIG. 19.

FIG. 20A shows the 3-port power converter of FIG. 19 illustrating the power flow from the rectified AC voltage (DC port 1) to the energy buffer (DC port 2) and the DC load (DC port 3).

Figure 20B:
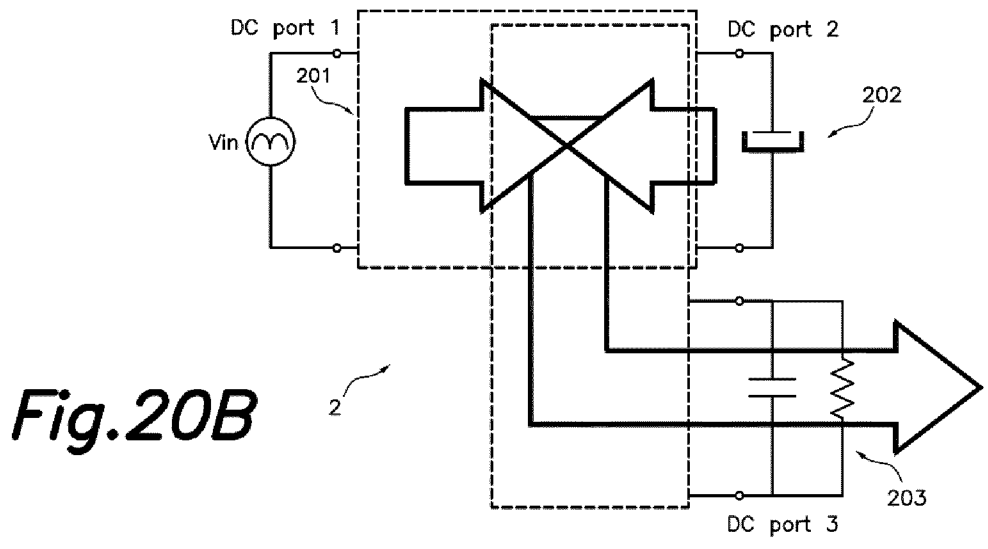
FIG. 20B show the 3-port power converter of FIG. 19 illustrating the power flow from the rectified AC voltage (DC port 1) and the energy buffer (DC port 2) to the DC load (DC port 3).

FIG. 20B shows the 3-port power converter of FIG. 19 illustrating the power flow from the rectified AC voltage (DC port 1) and the energy buffer (DC port 2) to the DC load (DC port 3).

Figure 20C:
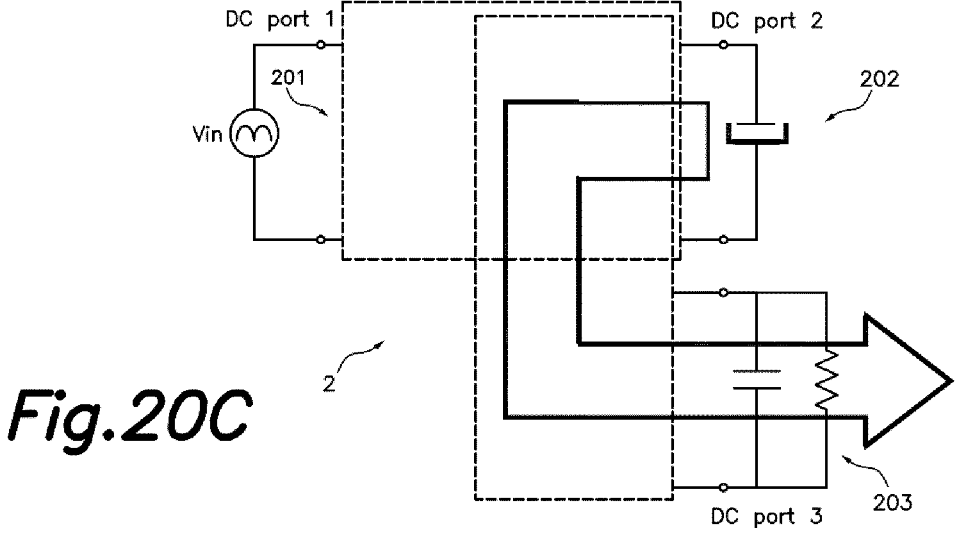
FIG. 20C show the 3-port power converter of FIG. 19 illustrating the power flow from the energy buffer (DC port 2) to the DC load (DC port 3).

FIG. 20C shows the 3-port power converter of FIG. 19 illustrating the power flow from the energy buffer (DC port 2) to the DC load (DC port 3).

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

The invention claimed is:

1. A switch mode electrical power converter, configured to operate connecting periodically a primary port with a secondary port, the primary port including a DC energy source and the secondary port including a DC load, the switch mode electrical power converter comprising:

a transformer or autotransformer, including a magnetizing inductance, each transformer winding comprising a series inductance;

at least a first power switch driven from a first driver terminal and having a first capacitance in parallel;

at least a second power switch driven from a second driver terminal and having a second capacitance in parallel; and a driver configured to turn on and off the at least a first power switch and the at least second power switch by using driving signals of the first driver terminal and of the second driver terminal;

the first power switch being arranged in a primary side of the transformer or autotransformer and the second power switch being arranged in a secondary side of the transformer or autotransformer, the first power switch and the second power switch being configured to connect the DC energy source to the DC load, through the transformer or autotransformer; and the first power switch and the second power switch being configured to be operated under the action of a corresponding driving signal provided by the driver and applied to the first and second driving terminals, and configured to provide a direct conducting status during a direct conduction time with a direct transfer of power from the primary port to the secondary port through the transformer or autotransformer with a limited magnetic energy storage, the limited magnetic energy storage being reset during a reset time of the switch mode electrical power converter;

a variety of sequences of intervals including corresponding topological circuits are obtainable and configured to assisting in a demagnetization of the transformer or autotransformer during a reset time under a switching frequency, starting with an interval including the first capacitance followed by another interval including the second capacitance after a phase shift; and a mean value of the current through the second power switch during the direct conduction time multiplied by the ratio between the direct conduction time and the switching frequency period is configured to determine a gain of the switch mode electrical power converter, a regulation of the switch mode electrical power converter is controlled by a variation of at least one of the switching frequency variation, a duty cycle of the first power switch and/or the second power switch and the phase shift, the variety of sequences of intervals comprise:

a direct conducting status interval, interval A, in which both the first power switch and the second power switch are in On state, interval A configured to provide a direct power flow from the primary port to the secondary port through the transformer or autotransformer, and a transformer reset before a next switching cycle comprising:

an interval B in which the first power switch is in Off state, and the second power switch is in On state, interval B configured to produce reset voltages determined by the winding series inductances, the magnetizing inductance, the first capacitance, and input and output voltages;

an interval C in which the first power switch is in Off state, and the second power switch is in Off state, interval C configured to produce reset voltages determined by the winding series inductances, the magnetizing inductance, the first capacitance, the second capacitance, and the input and output voltages; and an interval D in which the first power switch is in On state, and the second power switch is in Off state, interval D configured to produce reset voltages determined by first winding series inductances, the magnetizing inductance, the second capacitance, and the input and output voltages; and the variety of sequences comprises a sequence A-B-C-D, a sequence A-B-D, or a sequence A-B-A-D, provided by the driving signals.

2. The switch mode electrical power converter (2) according to claim 1, further comprising a first clamping capacitance connected to a first clamping switch and a second clamping capacitance connected to a second clamping switch, the first clamping capacitance and the first clamping switch being connected in parallel with the first power switch, the second clamping capacitance and the second clamping switch being connected in parallel with the second power switch, the reset voltages produced in interval B are further determined by the first clamping capacitance, the reset voltages produced in interval C are further determined by the first clamping capacitance and the second clamping capacitance, and the reset voltages produces in interval D are further determined by the second clamping capacitance.

3. The switch mode electrical power converter according to claim 2, wherein the first clamping power switch and the second clamping power switch are driven by first and second additional driving terminals and configured to clamp a maximum voltage of the first power switch and of the second power switch.

4. The switch mode electrical power converter according to claim 3, wherein a timing of a driving signal applied to the driving terminal of the first power switch and a driving signal applied to it's a first additional driving terminal of the first clamping power switch are configured to set a maximum voltage applied to the first power switch.

5. The switch mode electrical power converter according to claim 3, wherein a timing of a driving signal applied to the driving terminal of the second power switch and a driving signal applied to it's a second additional driving terminal of the second clamping power switch are configured to set a maximum voltage applied to the second power switch.

6. The switch mode electrical power converter according to claim 1, further comprising a control unit configured to control the driver.

7. The switch mode electrical power converter according to claim 1, wherein the first power switch and the second power switch are included in windings of the transformer or autotransformer or in a part thereof.

8. The switch mode electrical power converter according to claim 1, wherein a timing of the driving signals applied to the driving terminals of the first power switch and the second power switch are exchanged enabling power flow from the secondary port to the primary port, providing a bi-directional power converter.

9. The switch mode electrical power converter according to claim 1, wherein the first clamping capacitance and the DC energy source are exchanged and/or the second clamping capacitance and the DC load.

10. The switch mode electrical power converter according to claim 1, wherein it is integrated to a Buck converter including an additional power switch forming a three port Buck-DPX regulated DC-DC-DC switch power converter, the magnetizing inductance is operated as an inductance of the Buck converter, and the gain of the switch mode electrical power converter between the primary port and the secondary port is regulated by changing the duty cycle and/or the switching frequency, power may flow from at least one port of the three ports to at least another port of the three ports forming a three port bidirectional switch model electrical power converter.

11. The switch mode electrical power converter according to claim 1, wherein it is integrated to a Buck converter including an additional power switch forming a three port Buck-DPX regulated AC-DC-DC switch power converter, the magnetizing inductance is operated as an inductance of the Buck converter, and the gain of the switch mode electrical power converter between the primary port and the secondary port is regulated by changing the duty cycle and/or the switching frequency, power may flow from at least one port of the three ports to at least another port of the three ports.

12. The switch mode electrical power converter according to claim 10, wherein the first power switch and the additional power switch are configured to operate the three port Buck-DPX as quasi-static DC-DC cells, a first DC input port is configured to receive a DC quasi static voltage from a rectified high power factor AC voltage, a second DC output port is configured to act as an energy buffer, and a third DC output port is configured to have tight DC voltage regulation.

13. The switch mode electrical power converter according to claim 12, further comprising an energy buffer comprising at least one capacitor configured to be dynamically adjusted to minimize indirect power with a voltage mean value in relation with an RMS value of an input voltage.

* * * * *